US009928150B2

(12) United States Patent
Lin et al.

(10) Patent No.: US 9,928,150 B2
(45) Date of Patent: Mar. 27, 2018

(54) SYSTEM AND METHOD FOR TESTING A LOGIC-BASED PROCESSING DEVICE

(71) Applicant: The Board of Trustees of the Leland Stanford Junior University, Palo Alto, CA (US)

(72) Inventors: Hai Lin, Stanford, CA (US); Subhasish Mitra, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 460 days.

(21) Appl. No.: 14/318,976

(22) Filed: Jun. 30, 2014

(65) Prior Publication Data
US 2015/0377961 A1 Dec. 31, 2015

(51) Int. Cl.
*G06F 11/22* (2006.01)
*G06F 17/50* (2006.01)
*G06F 11/263* (2006.01)

(52) U.S. Cl.
CPC ........ *G06F 11/2236* (2013.01); *G06F 11/263* (2013.01)

(58) Field of Classification Search
USPC ........................................................ 716/136
See application file for complete search history.

(56) References Cited

U.S. PATENT DOCUMENTS

| 6,480,800 B1* | 11/2002 | Molyneaux | G01R 31/31836 702/117 |
| 7,320,114 B1* | 1/2008 | Jain | G06F 11/261 714/47.1 |
| 2008/0295045 A1* | 11/2008 | Aktouf | G06F 17/5045 716/136 |
| 2013/0036294 A1* | 2/2013 | Steiss | G06F 9/30185 712/205 |
| 2015/0186251 A1* | 7/2015 | Friedler | G06F 11/3672 717/124 |

OTHER PUBLICATIONS

Khoshavi et al., "Control-flow error detection using combining basic and program-level checking in commodity multi-core architectures", Jun. 15-17, 2011, 2011 6th IEEE International Symposium on Industrial and Embedded Systems, pp. 103-106.*
Abramovici, Miron et al., "A Reconfigurable Design-for-Debug Infrastructure for SoCs," 2006 43rd ACM/IEEE Design Automation Conference, 2006, San Francisco, CA, pp. 7-12.
(Continued)

*Primary Examiner* — Bryce Aisaka
(74) *Attorney, Agent, or Firm* — Withrow & Terranova, P.L.L.C.

(57) ABSTRACT

A method of operating a test device for a logic-based processing device includes the steps of providing an original set of test instructions, generating one or more Quick Error Detection (QED) test programs, and causing the one or more QED test programs to be executed on the logic-based processing device. Each one of the QED test programs includes the original test program with additional instructions inserted at strategic locations within the original set, wherein the additional instructions and the strategic locations vary between each of the QED test programs.

28 Claims, 27 Drawing Sheets

(56) References Cited

OTHER PUBLICATIONS

Adir, Allon et al., "Threadmill: A Post-Silicon Exerciser for Multi-Threaded Processors," 2011 48th ACM/EDAC/IEEE Design Automation Conference (DAC), Jun. 5-10, 2011, San Diego, CA, pp. 860-865.

Amyeen, M. Enamul et al., "Microprocessor System Failures Debug and Fault Isolation Methodology," 2009 International Test Conference, Nov. 1-6, 2009, Austin, TX, pp. 1-10.

Author Unknown, "OpenSPARC™ T2 Core Microarchitecture Specification," Sun Microsystems, Inc., Revision A, Dec. 2007, 296 pages.

Bentley, Bob et al., "Validating the Intel® Pentium® 4 Processor," Intel Technology Journal, vol. 5, Issue 1, 2001, pp. 1-8.

Bojan, Tommy et al., "Functional Coverage Measurements and Results in Post-Silicon Validation of Core™ 2 Duo Family," IEEE International High Level Design Validation and Test Workshop, Nov. 7-9, 2007, Irvine, CA, pp. 145-150.

Hong, T. et al., "QED: Quick Error Detection Tests for Effective Post-Silicon Validation," 2010 IEEE International Test Conference, Nov. 2-4, 2010, Austin, TX, pp. 1-10.

Josephson, Doug, "The Good, the Bad, and the Ugly of Silicon Debug," 2006 43rd ACM/IEEE Design Automation Conference, 2006, San Francisco, CA, pp. 3-6.

Keshava, Jagannath et al., "Post-Silicon Validation Challenges: How EDA and Academia Can Help," 2010 47th ACM/IEEE Design Automation Conference, Jun. 13-18, 2010, Anaheim, CA, pp. 3-7.

Lin, David et al., "Overcoming Post-Silicon Validation Challenges Through Quick Error Detection (QED)," 2013 Design, Automation & Test in Europe Conference & Exhibition, Mar. 18-22, 2013, IEEE, 6 pages.

Lin, David et al., "Quick Detection of Difficult Bugs for Effective Post-Silicon Validation," 2012 49th ACM/EDAC/IEEE Design Automation Conference (DAC), Jun. 3-7, 2012, San Francisco, CA, 6 pages.

Lin, David et al., "Quick Error Detection Tests with Fast Runtimes for Effective Post-Silicon Validation and Debug," 2015 Design Automation & Test in Europe Conference & Exhibition, Mar. 9-13, 2015, Grenoble, France, IEEE, 6 pages.

Martin, Milo M. K. et al., "Multifacer's General Execution-Driven Multiprocessor Simulator (GEMS) Toolset," ACM SIGARCH Computer Architecture News, vol. 33, Issue 4, Sep. 2005, 8 pages.

McKenney, Paul E., "Memory Ordering in Modem Microprocessors, PART I," Linux Journal, Issue 136, Aug. 2005, 7 pages.

Michael, Maged M. et al., "Simple, Fast, and Practical Non-Blocking and Blocking Concurrent Queue Algorithms," Proceedings of the 15th Annual ACM Symposium on Principles of Distributed Computing, 1996, 9 pages.

Oh, Nahmsuk et al., "Control-Flow Checking by Software Signatures," IEEE Transactions on Reliability, vol. 51, Issue 2, Mar. 2002, pp. 111-122.

Oh, Nahmsuk et al., "Error Detection by Duplicated Instructions in Super-Scalar Processors," IEEE Transactions on Reliability, vol. 51, Issue 1, Mar. 2002, pp. 63-75.

Reick, Kevin, "Post-Silicon Debug," DAC Workshop on Post-Silicon Debug: Technologies, Methodologies, and Best-Practices, IEEE/ACM Design Automation Conference, Jun. 7, 2012, 13 pages.

Zarrineh, Kamran et al., "Self Test Architecture for Testing Complex Memory Structures," Proceedings of the IEEE International Test Conference, 2000, Atlantic City, NJ, pp. 547-556.

\* cited by examiner

```
INT a, b;
INT c, d;
a = b = 0;
c = 3;
d = 1;
• • •
a = c + d;
b = c - d;
```

ORIGINAL TEST PROGRAM

```
INT a, b;  // selected for PLC
INT c, d;  // not selected for PLC
INT a', b', c', d';
a = a' = 0;
b = b' = 0;
c = c' = 3;
d = d' = 1;
PLC - LIST = [<&a, &a'>, <&b, &b'>];
• • •
LOCK (a);
LOCK (a');
a = c + d;
a' = c' + d';
UNLOCK (a);
UNLOCK (a');
CHECK (a = = a'); // EDD1-V CHECK
LOCK (b);
LOCK (b');
b = c - d;
b' = c' - d';
UNLOCK (b);
UNLOCK (b');
CHECK (b = = b'); // EDD1-V CHECK
```

QED TEST PROGRAM

*FIG. 18*

SYSTEM AND METHOD FOR TESTING A LOGIC-BASED PROCESSING DEVICE

This invention was made with Government support under contract 0643319 awarded by the National Science Foundation. The Government has certain rights in this invention.

FIELD OF THE DISCLOSURE

The present disclosure relates to the efficient and systematic generation of test programs for a logic-based processing device, which allow for expedited detection and localization of bugs.

BACKGROUND

Logic-based processing devices form an integral part of many modern electronic devices. In order to create innovative electronic devices with ever-increasing performance standards, there is a constant effort to improve the speed and efficiency of logic-based processing devices. Generally, a logic-based processing device includes several design, testing, verification, and validation stages throughout the manufacturing process. First, a logic-based processing device is designed through the use of one or more software design tools. The functionality of the logic-based processing device design is then verified using additional software in what is known as a pre-silicon verification process. The pre-silicon verification process allows a manufacturer to detect and fix bugs in the logic architecture of the logic-based processing device before manufacturing. Next, one or more prototypes of the logic-based processing device are manufactured, and subsequently tested in what is known as a post-silicon validation process. Post-silicon validation is used to detect bugs not only in the logic architecture of the logic-based processing device, but also from manufacturing process variations or other environmental issues. Upon fixing any detected bugs, the logic-based processing device can then be manufactured on a large scale.

Pre-silicon verification and post-silicon validation are crucial steps in the design, test, and manufacturing of integrated circuits. As discussed above, pre-silicon verification allows a manufacturer to detect and correct bugs in one or more parts of a logic-based processing device before it is manufactured, thereby saving time and money. During pre-silicon verification, a virtualized logic-based processing device including one or more inputs and one or more outputs is loaded into a verification system such as a simulator, simulation accelerator, or emulator. A variety of tests are then run on the design of the logic-based processing device in order to detect bugs (i.e., design flaws) in the circuit design. The tests generally supply input data to the inputs of the logic-based processing device and perform checks on the behavior of the logic-based processing device. If the behavior of the logic-based processing device differs from what is expected given the input data, an error is detected.

When an error is detected, the bug that caused the error is debugged in order to determine the root cause and location of the error in the logic circuitry or other components of the logic-based processing device. Localization allows a designer to find and correct the bug. One problem with pre-silicon verification arises due to error detection latency, which is the time between the occurrence of an error due to a bug and the detection of the error by a test. Bugs with error detection latencies longer than a few thousand clock cycles are highly challenging to localize due to the large number of intervening instructions executed by the logic-based processing device between the time the error occurs and the detection of the error. In other words, due to the large error detection latency, it is extremely difficult to trace back in history to the origin of the detected error. Accordingly, a pre-silicon verification process is needed that is capable of detecting errors with a low error detection latency.

Post-silicon validation is similar to pre-silicon verification, but occurs on one or more prototypes of a logic-based processing device that have been physically manufactured. Post-silicon validation is essentially the real world counterpart to pre-silicon verification, allowing manufacturers to detect bugs attributable not only to the architecture of the logic-based processing device, but also due to process variations, manufacturing defects, and environmental issues. Generally, pre-silicon verification alone is inadequate to fully vet a logic-based processing device, as it is often too slow and incapable of detecting bugs that may only occur after the logic-based processing device is manufactured. Failure to detect such bugs may be incredibly costly to a manufacturer, who may be left with a large inventory of inferior or inoperable logic-based processing devices. Accordingly, pre-silicon verification and post-silicon validation are often used together in order to adequately test a logic-based processing device.

Conventional post-silicon validation approaches have often been ad-hoc, focusing on the manual creation of test programs based on heuristics such as designer knowledge. Such an approach is not only time consuming, but costly as well. Further, as the complexity of logic-based processing devices continues to increase, so does the difficulty of creating reliable and robust post-silicon validation tests. Generally, the crux of post-silicon validation tests is not the detection of errors, but rather the localization of the bugs that caused a detected error. Previous efforts to localize bugs during post-silicon validation have focused on either simulation to obtain an expected response, or failure reproduction, which involves returning the system to an error-free state and re-running the system with the exact input stimuli to reproduce the failure. Simulation is orders of magnitude slower than running a physical test on the logic-based processing device itself, while failure reproduction is often difficult due to intermittency in the detected error because of uncontrollable factors such as asynchronous inputs or outputs and multiple-clock domains.

Further, conventional approaches to post-silicon validation suffer from the same error detection latency problems as discussed above with respect to pre-silicon verification. That is, it may take several billion clock cycles between the occurrence of an error and the detection thereof. As a result, processes for pre-silicon verification and post-silicon validation are needed that are capable of consistently detecting errors with a decreased error detection latency, while being cost effective and easy to generate.

SUMMARY

The present disclosure relates to the automatic and systematic generation of test programs for a logic-based processing device, which allow for expedited detection and localization of bugs. In one embodiment, a method of operating a test device for a logic-based processing device includes the steps of providing an original test program, generating a family of one or more Quick Error Detection (QED) test programs, and causing the family of one or more QED test programs to be executed on the logic-based processing device. Each one of the QED test programs includes the original test program with additional instructions inserted at strategic locations within the original test program, wherein the additional instructions and the strategic locations vary between each of the QED test programs.

According to one embodiment, the additional instructions check for deviation of the logic-based processing device from an expected behavior due to one or more bugs. Inserting the additional instructions at strategic locations within the original test program improves the coverage (i.e., bug detection capability) and reduces the error detection latency of the QED test programs when compared to the original test program, thereby reducing the difficulty of bug detection and localization for the logic-based processing device.

According to one embodiment, a test device for a logic-based processing device includes a general purpose processor and a memory. The memory includes an original test program, and instructions configured to cause the general purpose processor to generate a family of one or more QED test programs. Each of the QED test programs include the original test program with additional instructions inserted at strategic locations in the original test program, wherein the instructions inserted and the strategic locations vary between each one of the QED test programs.

According to one embodiment, the additional instructions check for deviation of the logic-based processing device from an expected behavior due to one or more bugs. Inserting the additional instructions at strategic locations within the original set improves the coverage (i.e., bug detection capability) and reduces the error detection latency of the QED test programs when compared to the original test program, thereby reducing the difficulty of bug localization for the logic-based processing device.

According to one embodiment, a logic-based processing device includes a logic-processing architecture and one or more uncore components. The one or more uncore components may include one or more hardware Proactive Load and Check (PLC) checkers. The one or more hardware PLC checkers may be configured to check one or more values produced by an original test program against one or more expected values at a predetermined interval. Using one or more hardware PLC checkers to check one or more values produced by an original test program against one or more expected values at a predetermined interval may save time and cost in the verification and/or validation of a logic-based processing device.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 18 shows an exemplary QED test program generated from an original test program using additional instructions as described in FIG. 17 according to one embodiment of the present disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
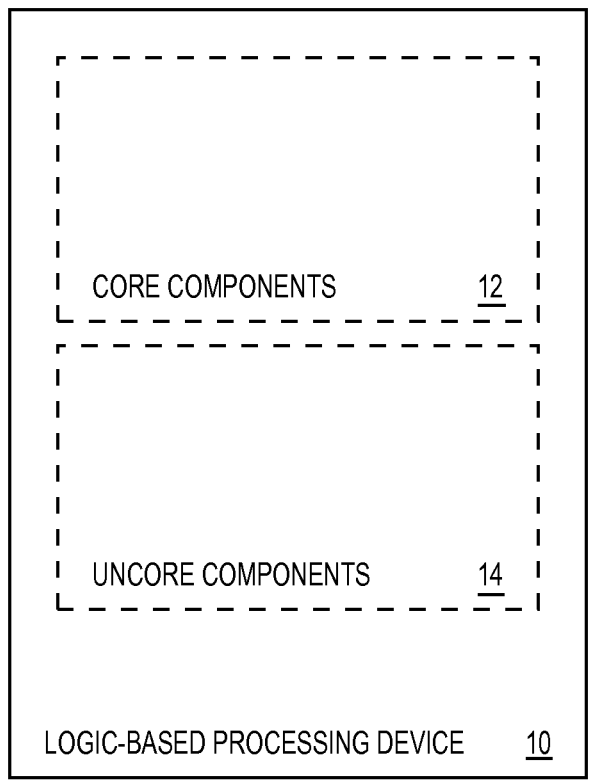
FIG. 1 shows an exemplary logic-based processing device according to one embodiment of the present disclosure.

Turning now to FIG. 1, a logic-based processing device 10 is shown according to one embodiment of the present disclosure. The logic-based processing device 10 includes both core components 12 and uncore components 14. Generally, the core components 12 include the logic architecture and various cores of the logic-based processing device 10, while the uncore components 14 include all other aspects of the logic-based processing device 10, such as caches, memory controllers, network controllers, and I/O controllers. Those of ordinary skill in the art will appreciate that uncore components may also be referred to as northbridge or nest components. As discussed above, both the core components 12 and the uncore components 14 of the logic-based processing device 10 must be thoroughly tested prior to large-scale manufacturing of the device.

Figure 2:
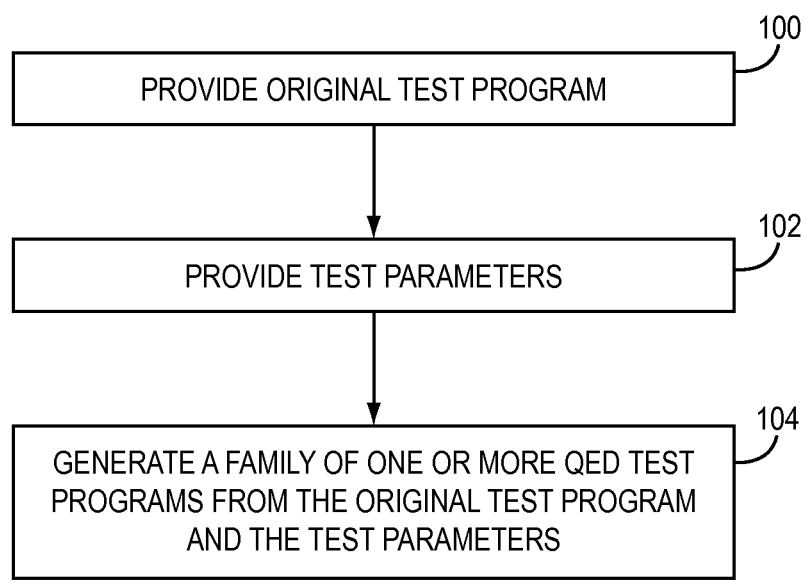
FIG. 2 is a flow diagram illustrating a method for systematically generating quick error detection (QED) test programs according to one embodiment of the present disclosure.

FIG. 2 shows a general overview of a method for systematically generating test programs for the logic-based processing device 10 with reduced error detection latency according to one embodiment of the present disclosure. First, an original test program is provided (step 100). Examples of original test program may be a series of randomly generated test instructions, targeted test instructions written by designers or validation engineers, a scientific program, a benchmark program, a user application, a game, or any other suitable test instructions. Next, one or more test parameters are provided (step 102). The original test program and the one or more test parameters are then used to systematically generate a family of one or more quick error detection (QED) test programs (step 104). The details of providing the original test program (step 100), providing the one or more test parameters (step 102), and generating the one or more QED test programs (step 104) are discussed below.

The QED test programs may be used in a pre-silicon verification or post-silicon validation process in order to detect bugs that may be present in the logic-based processing device 10 or a virtualized version thereof. By systematically generating one or more QED test programs, the time and cost involved in the testing of the logic-based processing device 10 can be significantly reduced due to improvement in the coverage and error detection latency of the tests, wherein coverage is defined as the ability of a test to detect one or more bugs, and error detection latency is defined as the time between the occurrence of an error and the detection of the error by a test. According to one embodiment, the QED test programs are generated by a computing device and used in a simulation environment to detect errors in the logic architecture of a virtualized version of the logic-based processing device 10. In other embodiments, the QED test programs are generated by a test device and executed on a physical prototype of the logic-based processing device 10 in order to detect errors present in the logic architecture of the logic-based processing device 10 as well as real world errors attributable to manufacturing defects and environmental issues.

Figure 3:
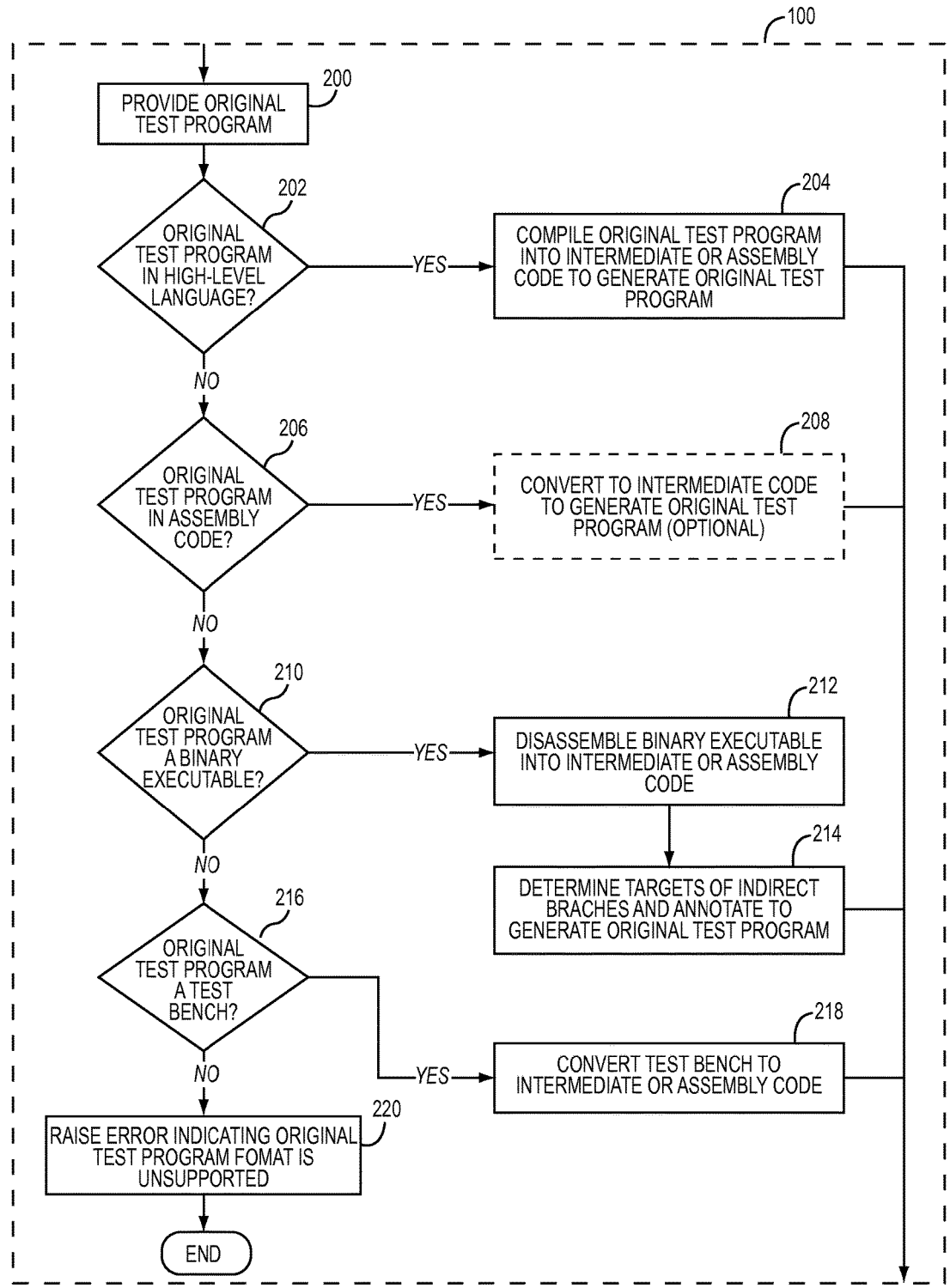
FIG. 3 is a flow diagram illustrating the details of providing an original test program according to one embodiment of the present disclosure.

FIG. 3 shows the specifics of providing the original test program (step 100) according to one embodiment of the present disclosure. First, an original test program is provided (step 200). As discussed above, the original test program may be a series of randomly generated instructions, targeted test instructions written by designers or validation engineers, a scientific program, a benchmark program, a user application, a game, or any other suitable test program. Further, the original test program may be provided in a high-level language, such as C or C++, a low-level language, such as x86/x86-64 assembly, PowerPC assembly, SPARC assembly, or LLVM bytecode, as a compiled binary executable, or as a test bench. Accordingly, the original test program may require processing to generate the original test program in the desired form. In order to do so, the original test program is examined to determine if it is in a high-level language (step 202). If the original test program is in a high-level language, the original test program is compiled into intermediate or assembly code to generate the original test program (step 204). If the original test program is not in a high-level language, the original test program is then examined to determine if it is in assembly code (step 206). If it is determined that the original test program is in assembly code, the original test program may optionally be converted to intermediate code to generate the original test program (step 208).

If the original test program is not in assembly code, the original test program is then examined to determine if it is a compiled binary executable (step 210). If the original test program is a compiled binary executable, the compiled binary executable is disassembled into intermediate or assembly code (step 212), and the targets of indirect branch instructions in the intermediate or assembly code are determined and annotated (step 214). An indirect branch instruction is defined as any branch instruction where the destination (i.e., target) of the branch instruction is not encoded in the instruction itself (i.e., the target is stored in a register or a memory location). An original test program provided as a complied binary executable may contain indirect branch instructions, the targets of which must be determined and annotated in order to correctly generate the one or more QED test programs. If the original test program is not a compiled binary executable, the original test program is then examined to determine if it is a test bench (step 216). If the original test program is a test bench, the test bench is converted to intermediate or assembly code (step 218). If the original test program is not in the form of a high level language, assembly code, intermediate code, a binary executable, or a test bench, an error is raised, indicating that the format of the original test program is unsupported (step 220), and the process is terminated.

Figure 4:
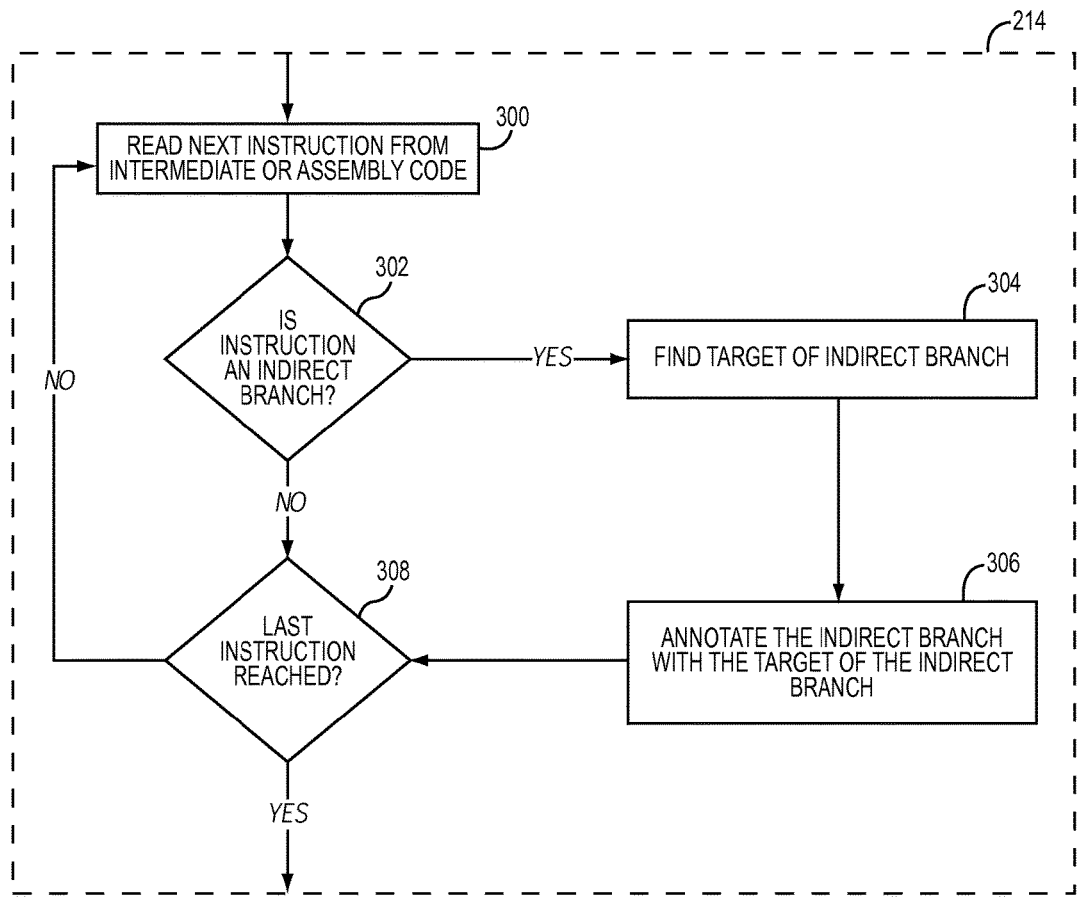
FIG. 4 is a flow diagram illustrating the details of determining and annotating target addresses of indirect branch instructions from a disassembled binary executable according to one embodiment of the present disclosure.

FIG. 4 shows the specifics of determining and annotating the target addresses of indirect branches in the intermediate or assembly code from the disassembled binary executable (step 214) according to one embodiment of the present disclosure. First, the next instruction of the intermediate or assembly code from the disassembled binary executable is read (step 300). The next instruction is then examined to determine if it is an indirect branch instruction (step 302). If the next instruction is an indirect branch, the target address of the indirect branch is found (step 304). The target address of the indirect branch is then annotated in the intermediate or assembly code disassembled from the binary executable (step 306). According to one embodiment, the annotation is inserted as a comment next to the indirect branch instruction. It is then determined if the next instruction is the last instruction in the intermediate or assembly code disassembled from the binary executable (step 308). If the next instruction is the last instruction, the process is finished. If the next instruction is not the last instruction, the process is repeated starting at step 300. If the next instruction is not an indirect branch, the process proceeds to step 308, as discussed above.

Figure 5:
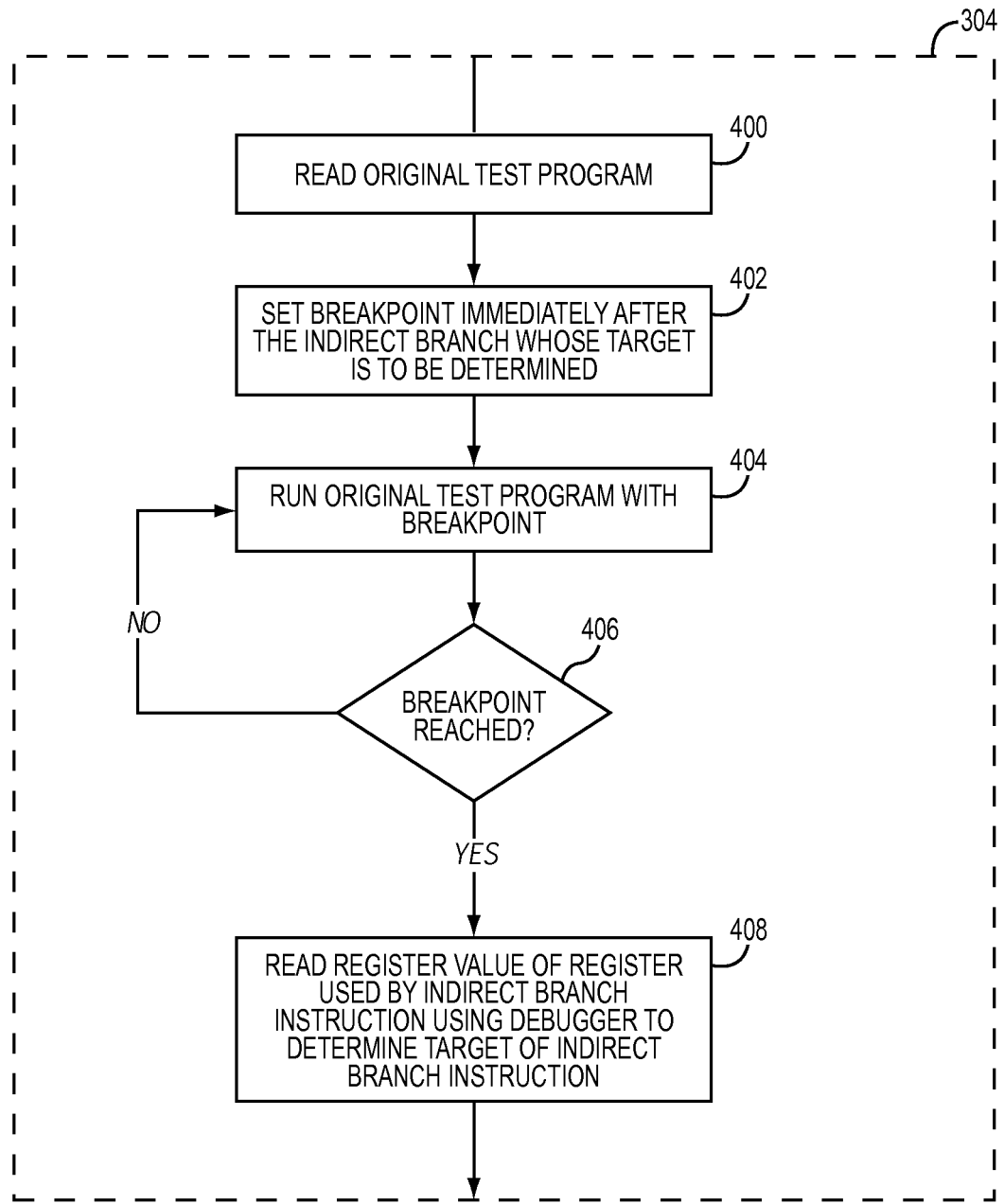
FIG. 5 is a flow diagram illustrating the details of finding the target addresses of an indirect branch instruction according to one embodiment of the present disclosure.

FIG. 5 shows the specifics of finding the target address of an indirect branch in the intermediate or assembly code disassembled from the binary executable (step 304) according to one embodiment of the present disclosure. First, the original test program is read (step 400). A breakpoint is set after the indirect branch whose target is to be determined (step 402). The original test program is then run with the breakpoint in place (step 404), and it is determined if the breakpoint has been reached (step 406). If the breakpoint has not been reached, the process proceeds back to step 404. If the breakpoint has been reached, the register value of the register used to store the target of the indirect branch instruction is read, for example, by a debugging program, in order to determine the target of the indirect branch (step 408), and the process is finished.

Figure 6:
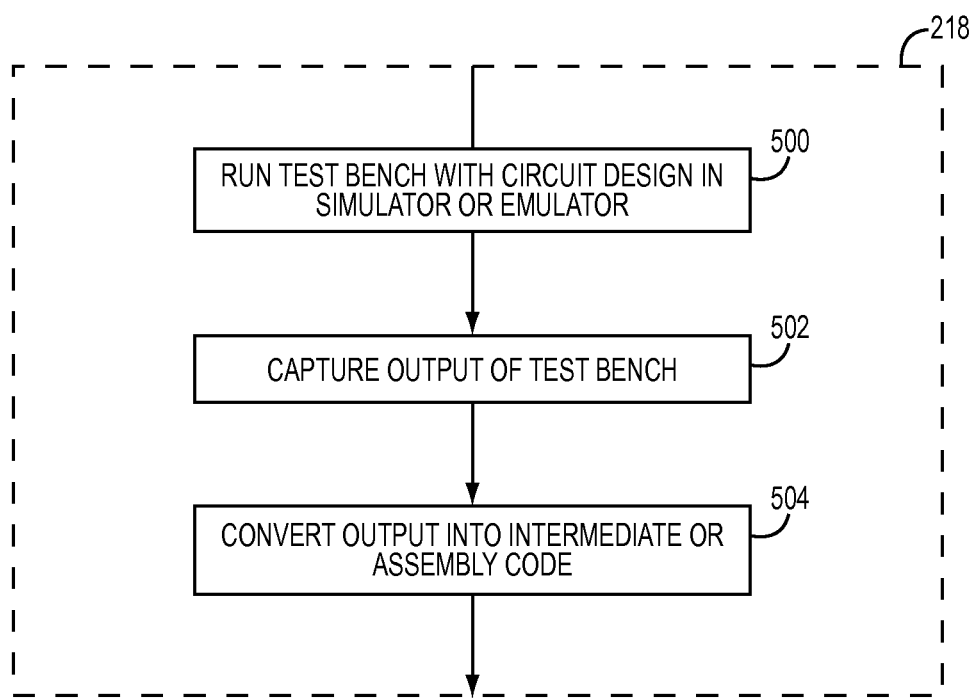
FIG. 6 is a flow diagram illustrating the details of converting a test bench to intermediate or assembly code according to one embodiment of the present disclosure.

FIG. 6 shows the specifics of converting a test bench to intermediate or assembly code (step 218) according to one embodiment of the present disclosure. First, the test bench is run with a desired circuit design in a simulator or emulator (step 500). The output of the test bench is captured (step 502). The captured outputs are then converted into intermediate or assembly code (step 504). Converting the captured outputs of the test bench to intermediate or assembly code can be accomplished by any suitable disassembler, as will be appreciated by those of ordinary skill in the art.

Figure 7:
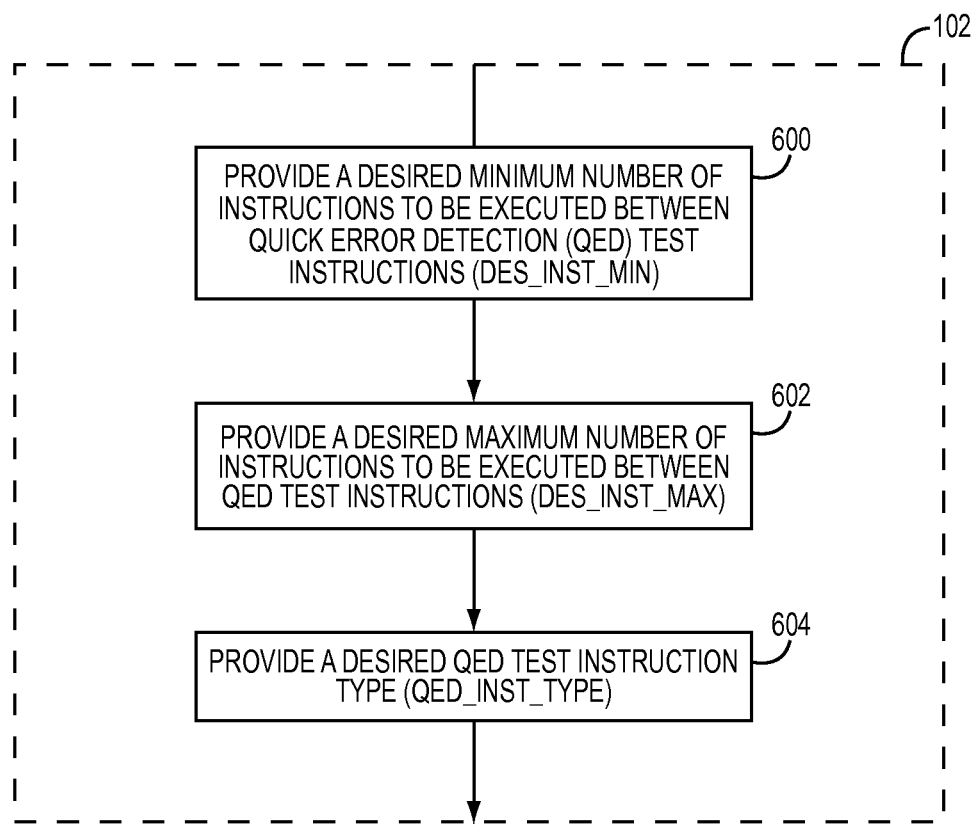
FIG. 7 is a flow diagram illustrating the details of providing one or more test parameters according to one embodiment of the present disclosure.

FIG. 7 shows the specifics of providing the test parameters (step 102) according to one embodiment of the present disclosure. As shown in FIG. 5, a desired minimum number of instructions of the original programs to be executed between QED test instructions (hereinafter des_inst_min) is provided (step 600). The desired minimum number of instructions to be executed between QED test instructions may represent the minimum number of instructions from the original test program that are executed between additional QED test instructions, as discussed in further detail below. Next, a desired maximum number of instructions to be executed between QED test instructions (hereinafter des_inst_max) is provided (step 602). The desired maximum number of test instructions to be run between QED test instructions may represent the maximum number of instructions from the original test program that are executed between additional QED test instructions, as discussed in further detail below. Finally, a desired QED test instruction type (hereinafter qed_inst_type) is provided (step 604). The QED test instruction type may indicate the type of QED test instructions that are added to the original test program to form the one or more QED test programs, as discussed in further detail below.

The aforementioned test parameters may be provided by any suitable means. In one exemplary embodiment, the test parameters are provided via user input. In another exemplary embodiment, the test parameters are randomly generated. Those of ordinary skill in the art will appreciate that the test parameters may be provided in many different ways, all of which are contemplated herein.

Figure 8:
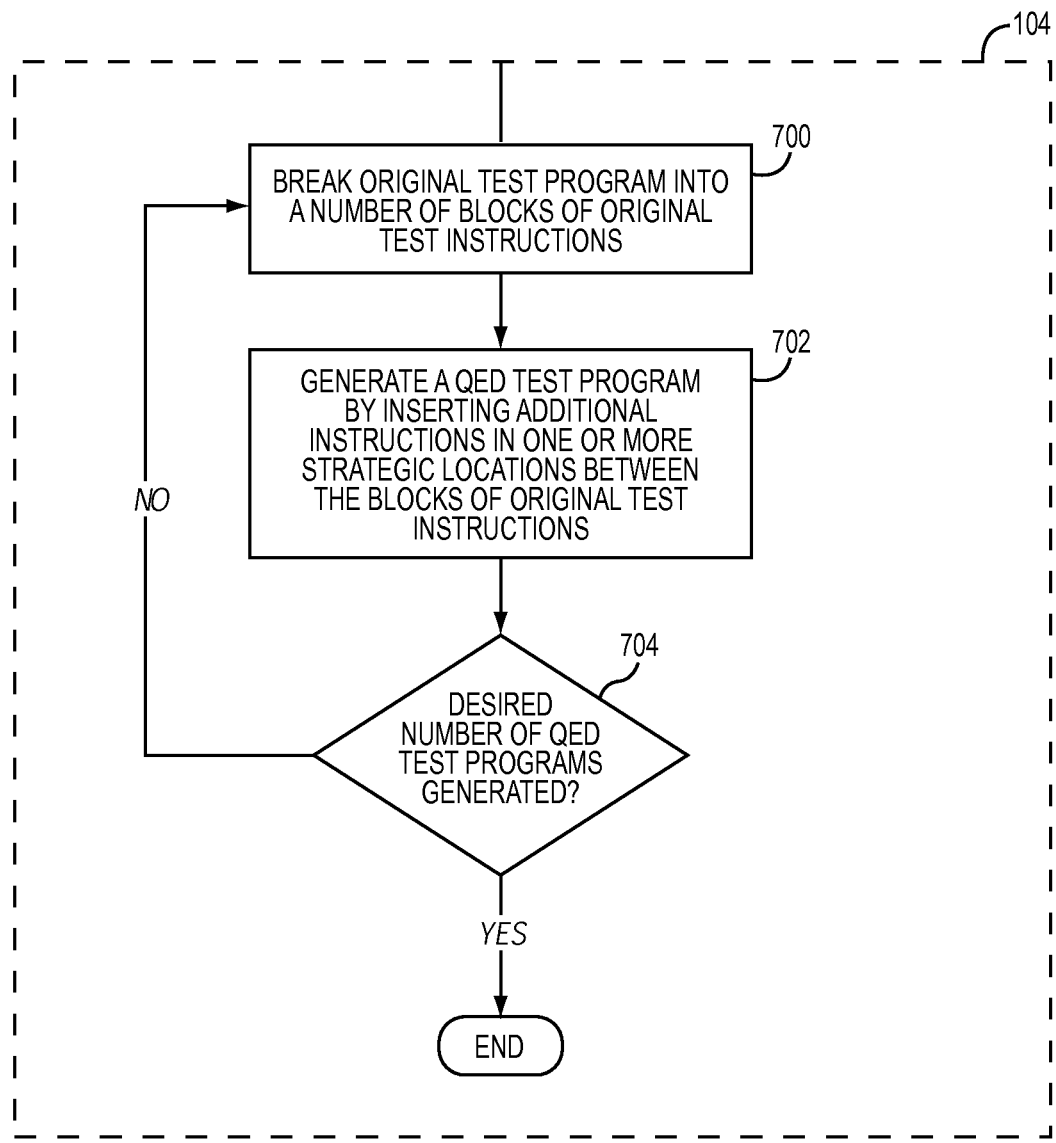
FIG. 8 is a flow diagram illustrating the details of generating one or more QED test programs according to one embodiment of the present disclosure.

FIG. 8 shows the specifics of generating one or more QED test programs from the original test program and the test parameters (step 104) according to one embodiment of the present disclosure. First, the original test program is broken into a number of blocks of original test instructions (step 700). As discussed in further detail below, the number and length of the different blocks of original test instructions may be determined in several different ways. Additional instructions are then inserted in one or more strategic locations between the various blocks of original test instructions (step 702). The resulting instruction set, which includes the original test program with additional instructions inserted at strategic locations therein, is referred to as a QED test program. A decision is then made to determine if a desired number of QED test programs have been generated (step 704). If a desired number of QED test programs have been generated, the process is finished. If a desired number of QED test programs have not been generated, step 700 is repeated. The size of the blocks of original test instructions may be chosen such that the strategic locations of the additional instructions inserted in the original test program occur frequently in order to minimize the error detection latency of the one or more QED test programs. Further, the number and length of the different blocks of original test instructions and thus the strategic locations of the additional instructions may vary between each one of the QED test programs. By varying the number and length of the different blocks of original test instructions and thus the strategic locations of the additional instructions, the coverage of bug detection in a logic-based processing device can be improved significantly, as each one of the QED test programs may be capable of producing latent bugs that may go undetected by another one of the QED test programs. Different schemes for choosing the number and length of the different blocks of original test instructions and thus the strategic locations of the additional instructions are discussed in detail below.

The additional instructions may be QED test instructions such as Error Detection by Duplication Instruction for Validation (EDDI-V) instructions, Proactive Load and Check (PLC) instructions, Control Flow Checking using Software Signatures for Validation (CFCSS-V) instructions, Control Flow Tracking using Software Signatures for Validation (CFTSS-V) instructions, or some combination of the above. The details of EDDI-V instructions, PLC instructions, CFCSS-V instructions, and CFTSS-V instructions are discussed below. Generating the QED test programs with QED test instructions at strategic locations therein significantly reduces the error detection latency and improves the coverage of each one of the QED test programs when compared to the original test program, thereby reducing the time and cost associated with testing a logic-based processing device.

Figure 9:
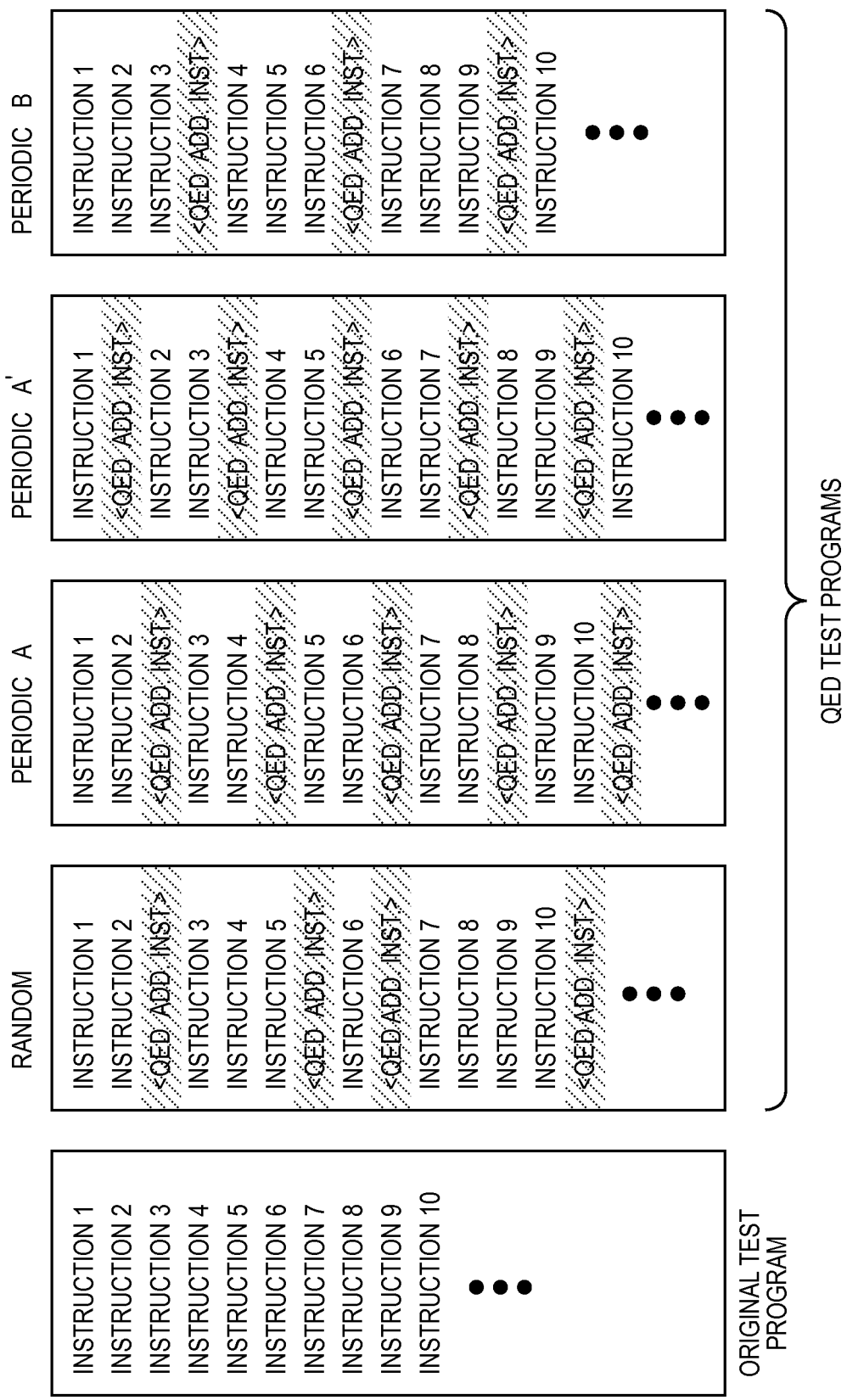
FIG. 9 shows several different configurations for the number and size of different blocks of original test instructions for a QED test program according to various embodiments of the present disclosure.

FIG. 9 illustrates several different configurations for the number and size of the different blocks of original test instructions and thus the strategic locations of the additional instructions in a QED test program. According to one embodiment, the additional instructions are inserted randomly in the original test program (RANDOM). The randomness of the insertion may be bounded, such that additional instructions must occur with a certain frequency in the original test program. According to an additional embodiment, the additional instructions are inserted periodically in the original test program, such that the period of the additional instructions is different between each one of the QED test programs. For example, a first QED test program may have additional instructions inserted after every two instructions from the original test program (PERIODIC A), while a second QED test program may have additional instructions inserted after every three instructions from the original test program (PERIODIC B). In other embodiments, one or more of the QED test programs may have additional instructions inserted at the same period, but in different locations. For example, a first QED test program may have additional instructions inserted after every two instructions from the original test program (PERIODIC A), while a second QED test program may have additional instructions inserted every two instructions from the original test program, starting after the first instruction of the original test program (PERIODIC $A^1$). As will be appreciated by those of ordinary skill in the art, the additional instructions may be inserted in the original test program according to several different patterns, all of which are contemplated herein.

Figure 10:
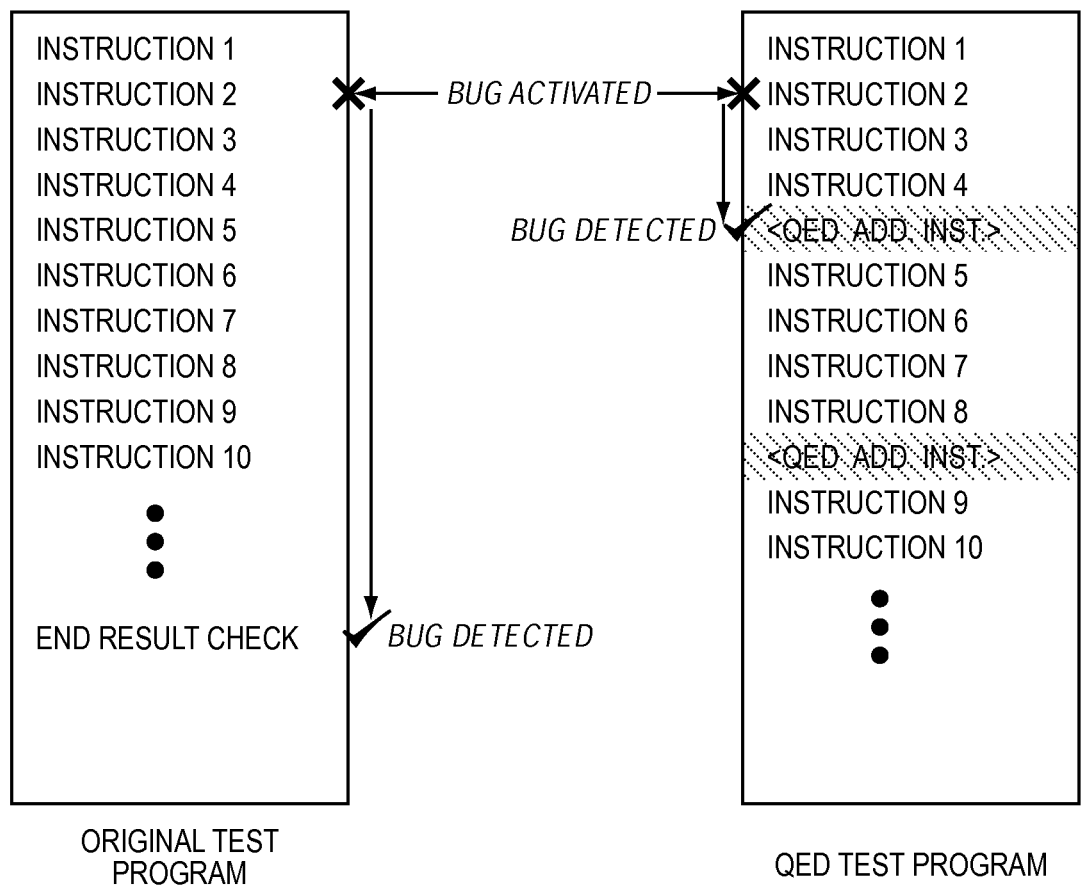
FIG. 10 illustrates the improvements in error detection latency experienced by QED test programs generated according to one or more embodiments of the present disclosure.

FIG. 10 illustrates the improvements in error detection latency experienced by each of the one or more QED test programs. As shown in FIG. 10, an exemplary original test program includes ten instructions. As discussed above, conventional testing processes for logic-based processing devices generally execute one or more original test programs, then perform an end result check after the execution is complete. Accordingly, any bugs activated during the execution of the original test program are not detected until after the execution is complete. As a specific example, if a bug is activated during the execution of the second instruction of the exemplary original test program, for example, due to an error in the design of the logic-based processing device on which the second instruction is being executed, at least eight additional instructions are executed before the bug is detected. In contrast, the exemplary QED test program includes additional instructions after each block of four original test instructions in the original test program. The additional instructions test for errors at a predetermined interval, thereby shortening the time between bug activation and bug detection. In the example provided in FIG. 9, the bug is activated in the second instruction, and detected two instructions later by the additional instructions. Accordingly, the exemplary QED test program has significantly reduced error detection latency when compared to the original test program. Those of ordinary skill in the art will appreciate that although only a small number of instructions are shown in the original test program and the QED test program shown in FIG. 10, real-world test instructions may include thousands or even billions of instructions, which further increase the disparity in performance between the original test program and the QED test program.

Figure 11:
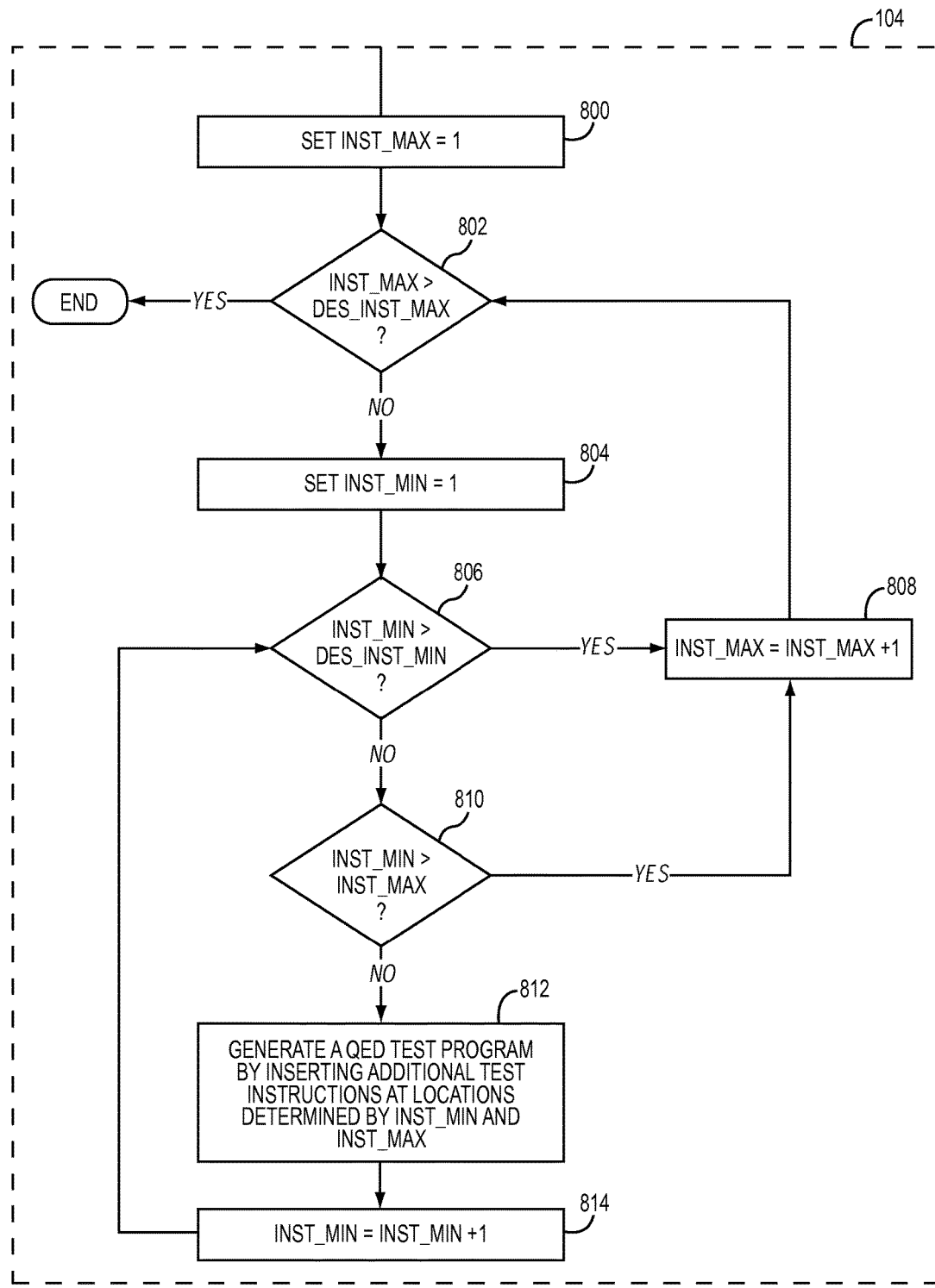
FIG. 11 is a flow diagram illustrating the details of generating one or more QED test programs according to an additional embodiment of the present disclosure.

FIG. 11 shows the specifics of generating one or more QED test programs from the original test program and the test parameters (step 104) according to an additional embodiment of the present disclosure. First, a parameter representing the current maximum number of instructions of the original test instructions that should execute between additional instructions (hereinafter inst_max) is set to one (step 800). A determination is then made whether inst_max is greater than des_inst_max (step 802). As discussed above, des_inst_max is a provided test parameter representing a desired maximum number of instructions of the original test program that should execute between additional instructions.

If inst_max is greater than des_inst_max, the process is finished. If inst_max is not greater than des_inst_max, a parameter representing the current minimum number of instructions of the original test program that should execute between additional instructions (hereinafter inst_min) is set to one (step 804). A determination is then made whether inst_min is greater than des_inst_min (step 806). As discussed above, des_inst_min is a provided test parameter representing a desired minimum number of instructions of the original test program that should execute between additional instructions. If inst_min is greater than des_inst_min, the value of inst_max is incremented by one (step 808), and the process is returned to step 802. If inst_min is not greater than des_inst_min, a determination is then made whether inst_min is greater than inst_max (step 810).

If inst_min is greater than inst_max, the value of inst_max is incremented by one (step 808), and the process is returned to step 802. If inst_min is not greater than inst_max, a QED test program is generated by inserting additional instructions in the original test program at strategic locations determined by inst_max and inst_min (step 812), as discussed in detail below. The value of inst_min is then incremented by one (step 814), and the process is returned to step 806.

Using des_inst_max and des_inst_min to generate one or more QED test programs allows a test designer to balance the error detection latency of the QED test program with the intrusiveness of the test. As discussed above, error detection latency is the time between the activation of a bug and detection of the bug. Intrusiveness corresponds to the ability of the original test program to detect a bug that is no longer detected by the QED test program. Generally, increasing inst_min decreases intrusiveness, and vice-versa. Further, decreasing inst_max decreases the error detection latency, and vice-versa. Unlike des_inst_max, which can always be satisfied, des_inst_min may be used as a "soft constraint". In other words, although a best effort may be made to satisfy both des_inst_max and des_inst_min, it may not always be possible to satisfy des_inst_min. For example, when the original test program has fewer instructions than des_inst_min, the test parameter cannot be satisfied.

According to one embodiment, code analysis techniques may be used to ensure that the test parameters des_inst_max and des_inst_min can be satisfied even if the original test program contains loops, condition branches, and synchronization primitives such as locks. For example, a small loop may contain fewer instructions than des_inst_min. In this case, the loop can be unrolled so that multiple iterations are executed without intervening branches. This way, larger blocks consisting of more than des_inst_min instructions can be constructed. Likewise, it may not be possible to divide a loop body containing more than des_inst_max instructions into blocks with more than des_inst_min instructions each. In this case, the loop can also be unrolled until the unrolled loop body can be divided into blocks of instructions that satisfy des_inst_min. For conditional branches, each path of the branch (including the paths of any nested conditional branches) may be considered separately, dividing the instructions of each path of the conditional branch into blocks of instructions satisfying both des_inst_max and des_inst_min. For locks, it may be ensured that the original and duplicated code blocks are enclosed by the same set lock and unlock instructions.

Figure 12:
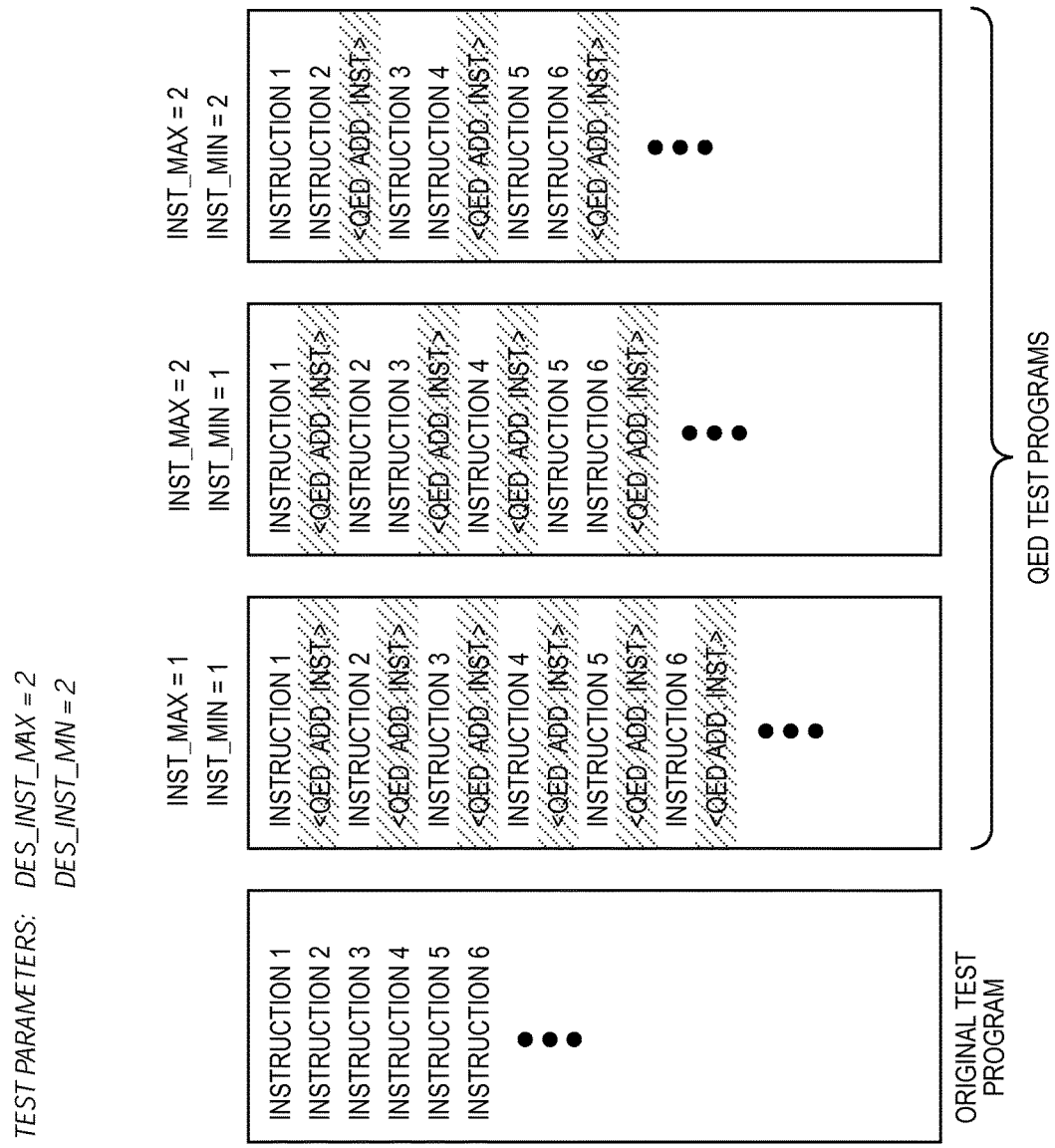
FIG. 12 shows several different configurations for the number and size of different blocks of original test instructions for a QED test program generated via the process illustrated in FIG. 11 according to various embodiments of the present disclosure.

FIG. 12 illustrates generating the QED test programs by inserting additional instructions in the original test program at strategic locations determined by inst_max and inst_min (step 812). In the example provided in FIG. 12, des_inst_max and des_inst_min are each set to two. Accordingly, the process described above with respect to FIG. 10 will generate three QED test programs. A first QED test program is generated for inst_max and inst_min equal to one, in which additional instructions are inserted after each block of one original test instruction. A second QED test program is generated for inst_max equal to two and inst_min equal to one, in which additional instructions are inserted after each block of one to two original test instructions. The number of instructions in each block of original test instructions where inst_max is not equal to inst_min may be dependent on the control flow of the original test program. That is, the number of instructions in a given block of original test instructions may depend on the instructions themselves. A third QED test program is generated for inst_max and inst_min equal to two, in which additional instructions are inserted after each block of two original test instructions.

Figure 13:
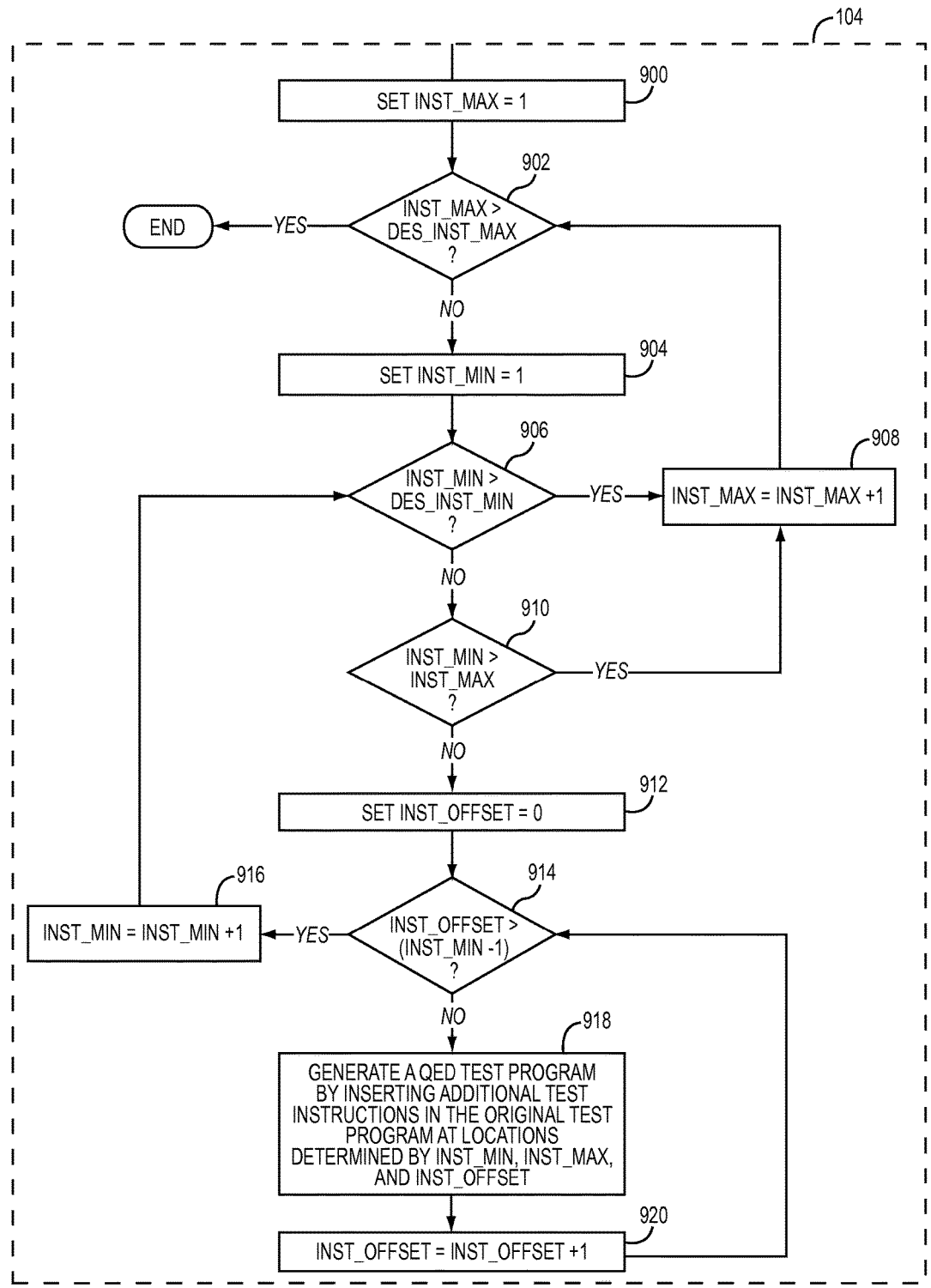
FIG. 13 is a flow diagram illustrating the details of generating one or more QED test programs according to an additional embodiment of the present disclosure.

FIG. 13 shows the specifics of generating one or more QED test programs from the original test program and the test parameters (step 104) according to an additional embodiment of the present disclosure. First, inst_max is set to one (step 900). A determination is then made whether inst_max is greater than des_inst_max (step 902). If inst_max is greater than des_inst_max, the process is finished. If inst_max is not greater than des_inst_max, the value of inst_min is set to one (step 904). A determination is then made whether inst_min is greater than des_inst_min (step 906). If inst_min is greater than des_inst_min, the value of inst_max is incremented by one (step 908), and the process is returned to step 902. If inst_min is not greater than des_inst_min, a determination is then made whether inst_min is greater than inst_max (step 910).

If inst_min is greater than inst_max, the value of inst_max is incremented (step 908), and the process is returned to step 902. If inst_min is not greater than inst_max, a parameter representing a number of instructions at which to begin inserting additional instructions (hereinafter inst_offset) is set to zero (step 912). A determination is then made whether inst_offset is greater than inst_min minus one (step 914). If inst_offset is greater than inst_min minus one, the value of inst_min is incremented (step 916), and the process is returned to step 906. If inst_offset is not greater than inst_min minus one, a QED test program is generated by inserting additional instructions in the original test program at strategic locations determined by inst_min, inst_max, and inst_offset (step 918), as discussed in detail below. The value of inst_offset is then incremented by one (step 920), and the process is returned to step 914.

Figure 14:
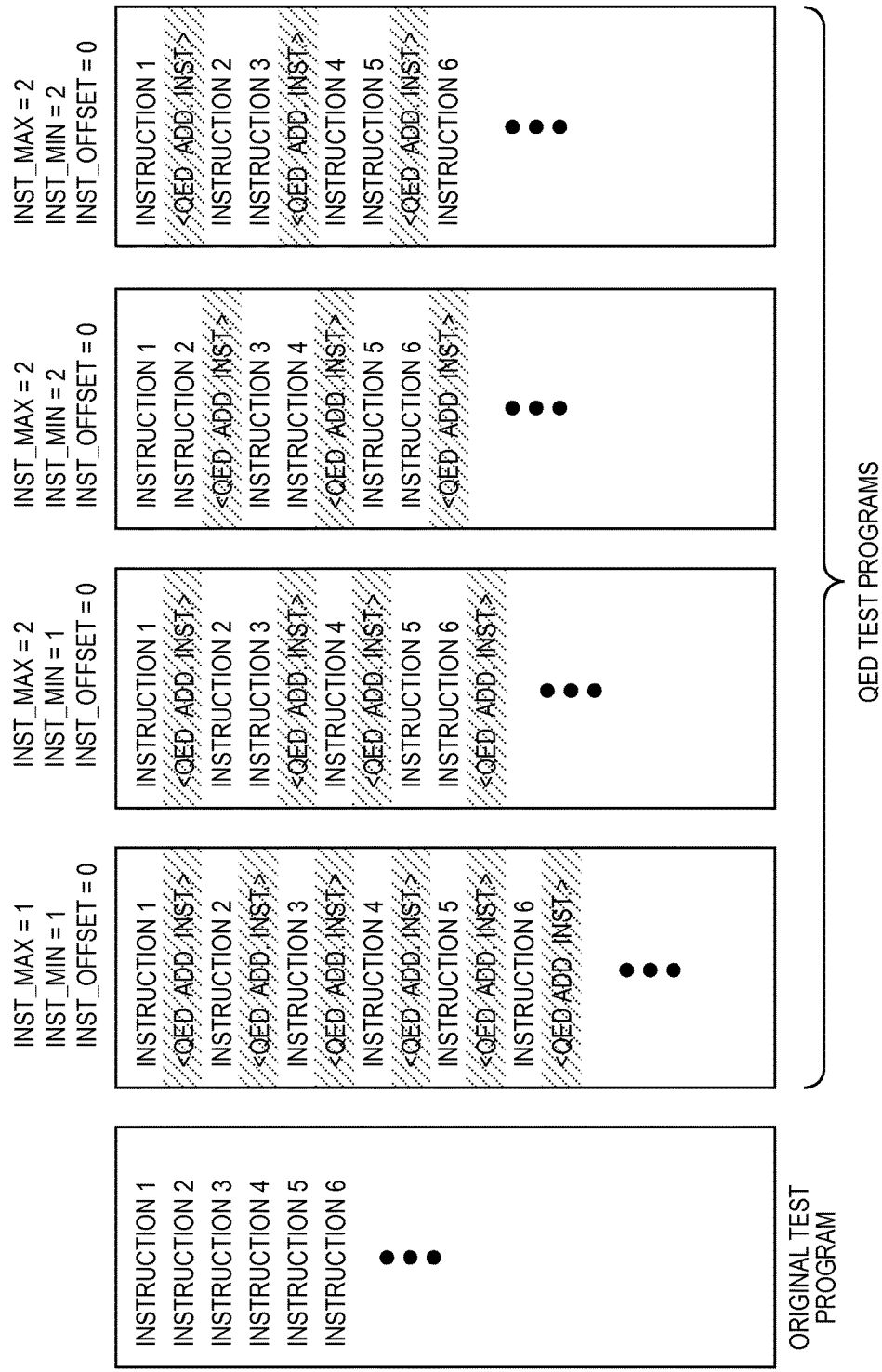
FIG. 14 shows several different configurations for the number and size of different blocks of original test instructions for a QED test program generated via the process illustrated in FIG. 13 according to various embodiments of the present disclosure.

FIG. 14 illustrates generating the QED test programs by inserting additional instructions in the original test program at strategic locations determined by inst_max, inst_min, and inst_offset (step 918). In the example provided in FIG. 14, des_inst_max and des_inst_min are each set to two. Accordingly, the process described above with respect to FIG. 12 will generate four QED test programs. A first QED test program is generated for inst_max and inst_min equal to one, and inst_offset equal to zero, in which additional instructions are inserted after each block of one original test instruction. A second QED test program is generated for inst_max equal to two, inst_min equal to one, and inst_offset equal to zero, in which additional instructions are inserted after each block of one to two original test instructions. Once again, the number of original test instructions in each block of original test instructions may be dependent on the control flow of the original test program in this case. A third QED test program is generated for inst_max and inst_min equal to two, and inst_offset equal to zero, in which additional instructions are inserted after each block of two original test instructions. Finally, a fourth QED test program is generated for inst_max and inst_min equal to two, and inst_offset equal to one, in which the additional instructions are inserted after each block of two original test instructions, starting after the first original test instruction.

Figure 15:
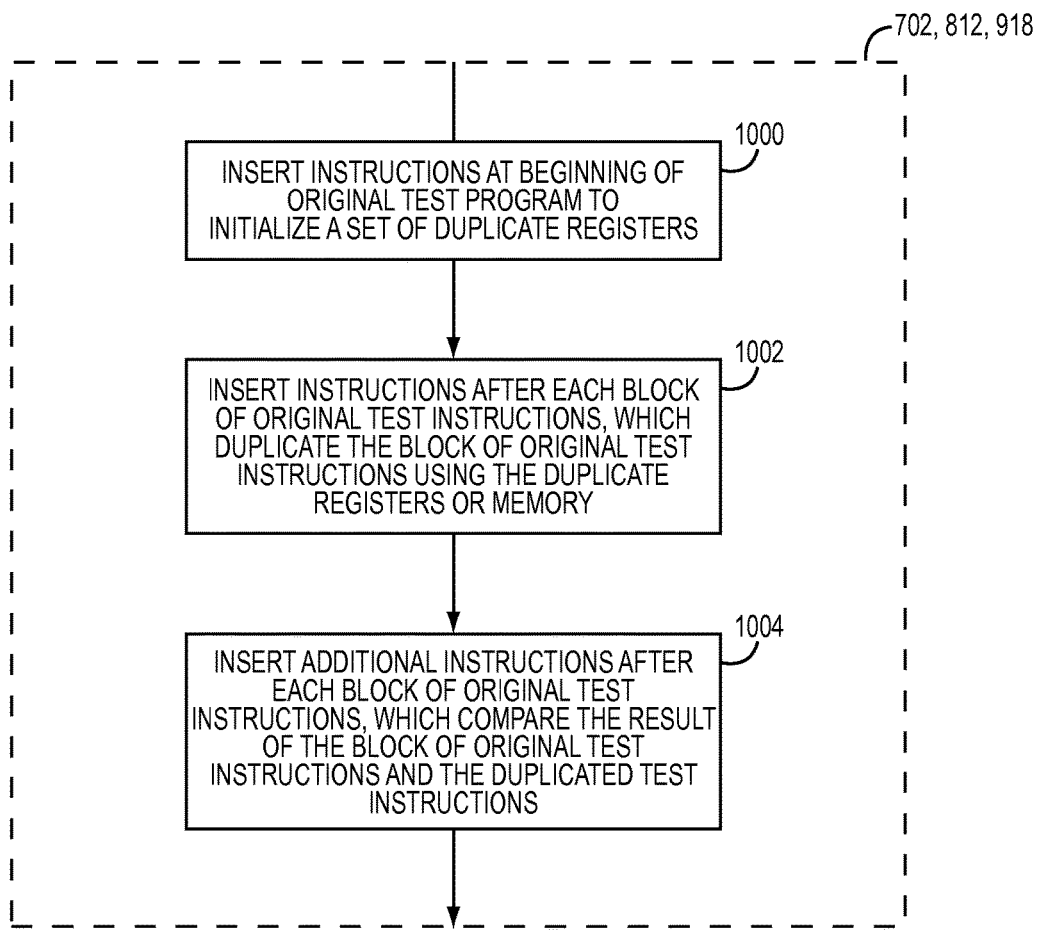
FIG. 15 is a flow diagram illustrating the details of inserting additional instructions in strategic locations of an original test program to generate a QED test program according to one embodiment of the present disclosure.

FIG. 15 shows the specifics of inserting additional instructions in strategic locations of the original test program (step 702, step 812, and step 918) wherein the additional instructions are EDDI-V test instructions. First, instructions are inserted at the beginning of the original test program, which initialize a set of duplicate registers or external memory locations with the contents of the registers used by the original test program (step 1000). Generally, if there are enough registers available to fully duplicate the registers used by the original test program, registers, rather than external memory locations, will be used. According to one embodiment, the instructions initializing the duplicate registers or external memory locations are provided throughout an initialization section of the original test program. Instructions are then inserted after each block of original test instructions, which duplicate the instructions in the block of original test instructions while acting on the duplicate registers or memory (step 1002). That is, for each arithmetic, logical, shift, move, load, or store instruction in the block of original test instructions, a corresponding duplicated instruction is created that operates on the corresponding duplicated registers or memory location initialized in step 1000. Accordingly, the contents of the registers used for the original test program and the duplicate registers or external memory locations should match upon completion of the corresponding duplicate instructions. Additional instructions are also inserted after each block of original test instructions to compare the result of the block of original test instructions to the result of the duplicated test instructions (step 1004). A mismatch in the comparison indicates an error. The additional instructions are inserted according to one of more of the schemes described above. By frequently testing for such errors, the error detection latency of the QED test program can be significantly reduced when compared to the original test program.

Figure 16:
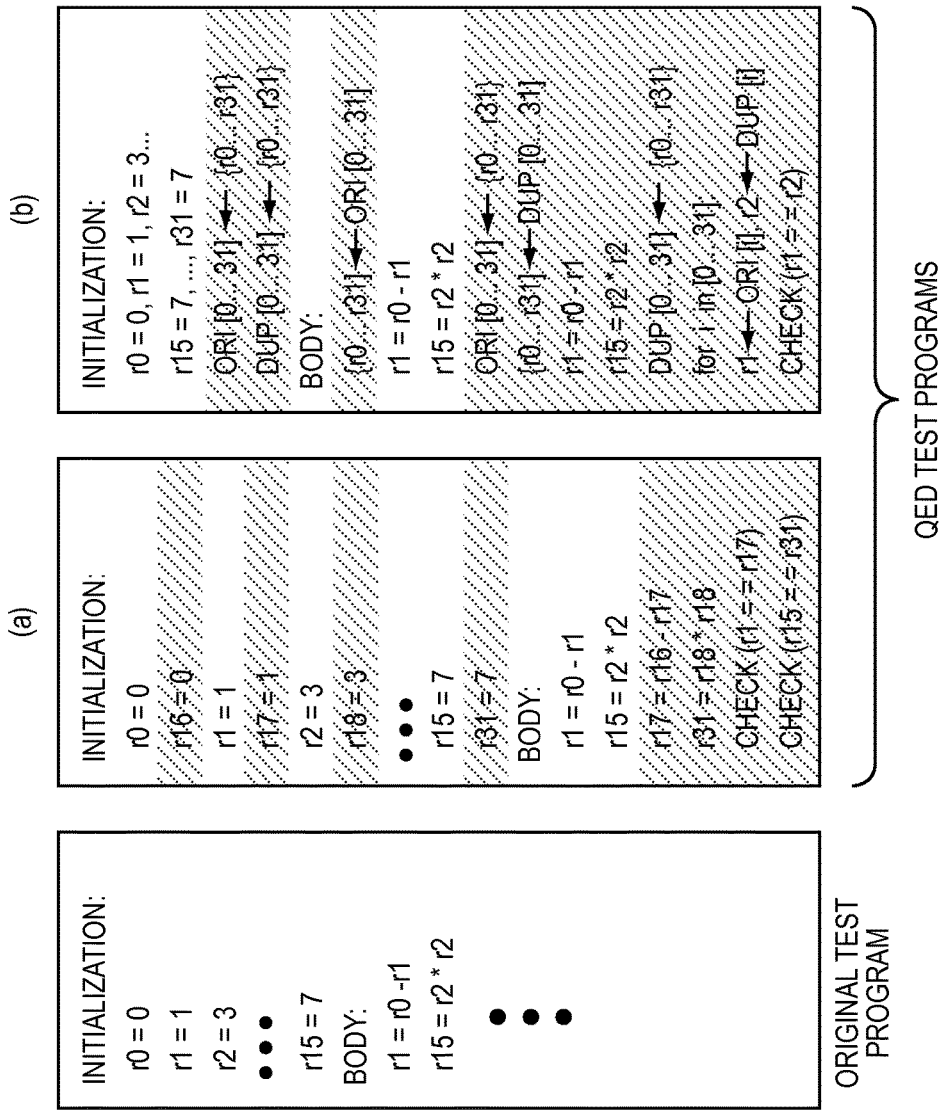
FIG. 16 shows exemplary QED test programs generated from an original test program using additional instructions as described in FIG. 15 according to one embodiment of the present disclosure.

FIG. 16 shows exemplary QED test programs generated from an original test program where the additional instructions are EDDI-V instructions. Specifically, a first QED test program (a) is shown where adequate registers exist to duplicate the values stored in the registers used by the original test program. Assuming the original test uses 16 registers (out of an available 32 registers), the QED test program first duplicates the contents of each register used by the original test instruction (r0-r15) set into a set of duplicate registers (r16-r31). This is done in the initialization section of the original test program. Next, after each block of original test instructions, additional instructions are inserted, which duplicate the block of original test instructions, but instead operate on the duplicate registers (for example, r1=r0−r1 is duplicated as r17=r16−r17). Finally, check instructions compare the result of the original registers and the duplicate registers, raising an error if they do not match. FIG. 16 also shows a second QED test program (b) in which adequate registers do not exist to duplicate the values stored in the registers used by the original test program. Assuming the original test program uses 32 registers (out of an available 32 registers), the QED test program must use memory to store the duplicate register values. Accordingly, two memory blocks are reserved (ORI[0 . . . 31] to store the original values stored in the registers used by the original test program, and DUP[0 . . . 31] to store the set of duplicate values). The test is then run as indicated above, wherein the blocks of original test instructions operate on the first reserved memory block (ORI[0 . . . 31]) and the additional instructions operate on the second reserved memory block (DUP[0 . . . 31]). Values from memory are moved into the registers as necessary to perform the operations. Finally, check instructions compare the contents of the values in different memory blocks (ORI[0 . . . 31] is compared to DUP[0 . . . 31]).

Figure 17:
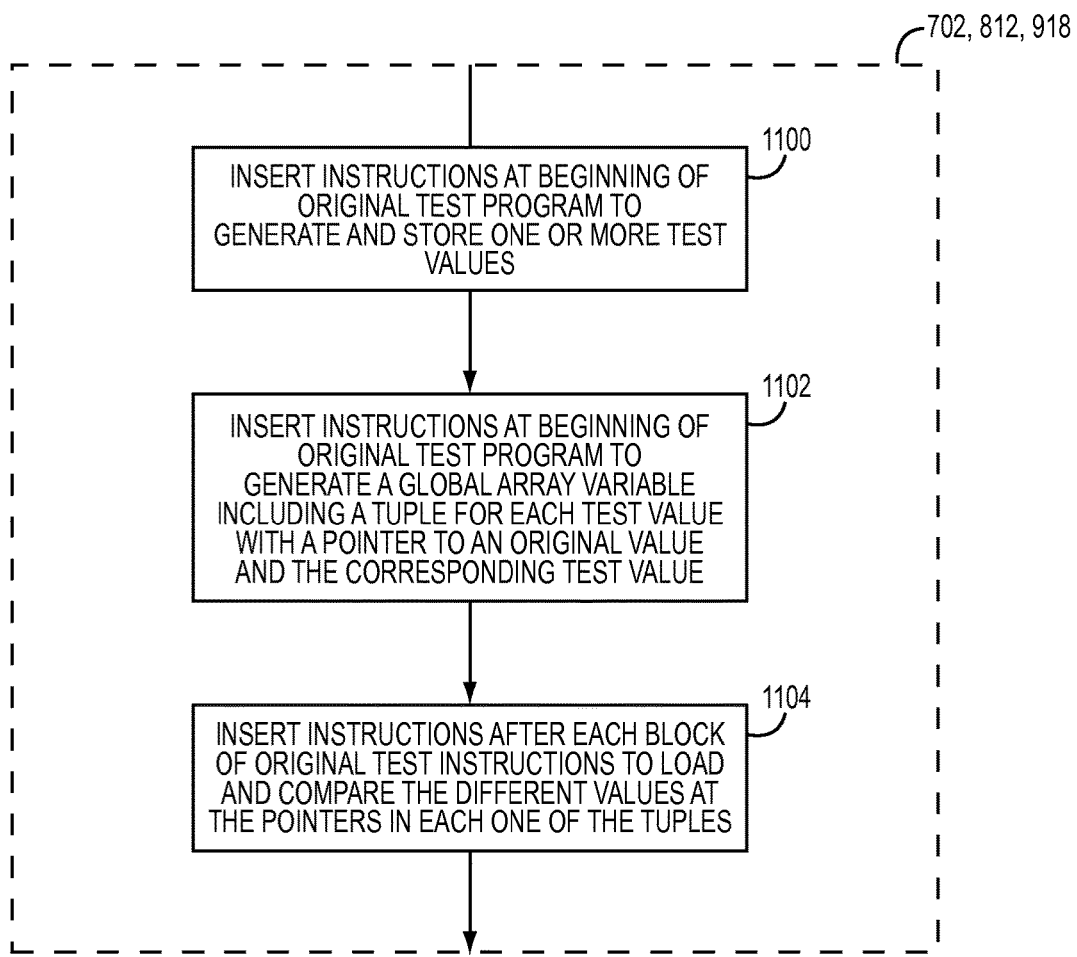
FIG. 17 is a flow diagram illustrating the details of inserting additional instructions in strategic locations of an original test program to generate a QED test program according to one embodiment of the present disclosure.

FIG. 17 shows the specifics of inserting additional instructions in strategic locations of the original test program (step 702, step 812, and step 918) wherein the additional instructions are PLC test instructions. Generally, PLC test instructions check one or more values generated by an original test program against one or more corresponding expected values. Specifically, instructions are inserted at the beginning of the original test program, which generate and store one or more test values corresponding with the values stored in the registers used by the original test program (step 1100). These instructions may be provided throughout an initialization section in the original test program. In one embodiment, EDDI-V instructions are first inserted into the original test program, as described above, and the test values correspond with the duplicate values generated by the EDDI-V instructions. In another embodiment, a hash for one or more of the values stored in the registers used by the original test instruction is generated and stored in a register or memory to be used as a test value, and updated as necessary. Instructions are then inserted to generate a global array including a tuple for each test value, wherein the tuple contains a pointer to the original value and the test value (step 1102). Additional instructions are also inserted after each block of original test instructions, which load and compare the original value and the test value for each pointer in each one of the tuples, raising an error if they do not match (step 1104). Again, the additional instructions are inserted according to one or more of the schemes described above. By frequently testing for such errors, the error detection latency of the QED test program can be significantly reduced when compared to the original test program.

FIG. 18 shows an exemplary QED instruction set generated from an original test program using EDDI-V and PLC additional instructions. As shown in FIG. 18, EDDI-V instructions are inserted in the original test program as described above. Further, a global array variable (PLC_List) is generated, which stores one or more tuples including a first pointer to a value used by the original test program and a second pointer to the corresponding duplicate value, as generated by the EDDI-V instructions (i.e., <original variable pointer, EDDI-V variable pointer>). In particular, a first variable (a) and a second variable (b) are selected for PLC testing, ignoring other variables. As will be appreciated by those of ordinary skill in the art, many different ways for selecting which variables are selected for PLC testing exist, all of which are contemplated herein. After each block of original test instructions, the tuple is locked and the values at the location indicated by each pointer in the tuple are loaded. The tuples are then unlocked, the loaded values are compared, and an error is raised if a mismatch is detected. Notably, PLC instructions should be run on all threads and all cores of a logic-based processing device. This is necessary to ensure robust bug detection. Accordingly, for multi-threaded tests, all variables listed in the global array variable (PLC_List) must be protected against race conditions between stores to these variables by one thread and PLC instructions executing on another thread. Such race conditions can occur due to unexpected interleaving of four operations: store to an original variable in the global array variable (PLC_List), store to the corresponding duplicate variable, load from the original variable in the global array variable (PLC_List), and load from the corresponding EDDI-V variable. As will be appreciated by those of ordinary skill in the art, protection against race conditions can be accomplished by locking the original variable and the corresponding duplicate variable during store and load operations to each one of the variables, as shown in FIG. 18.

Although the insertion of PLC instructions in the QED test programs significantly decreases the error detection latency thereof, such an improvement comes at the expense of an increased runtime. An increased runtime of each one of the QED test programs ultimately results in increased cost associated with the testing of a logic-based processing device 10. In an effort to expedite the testing process, PLC operations may be performed on one or more dedicated hardware devices located in the uncore components 14 of the logic-based processing device 10 in a process known as Fast PLC. Using dedicated hardware to perform PLC checking results in significant improvements in the runtime of the QED test programs, thereby reducing the cost associated with testing of a logic-based processing device while maintaining or improving the efficacy of bug detection.

Figure 19:
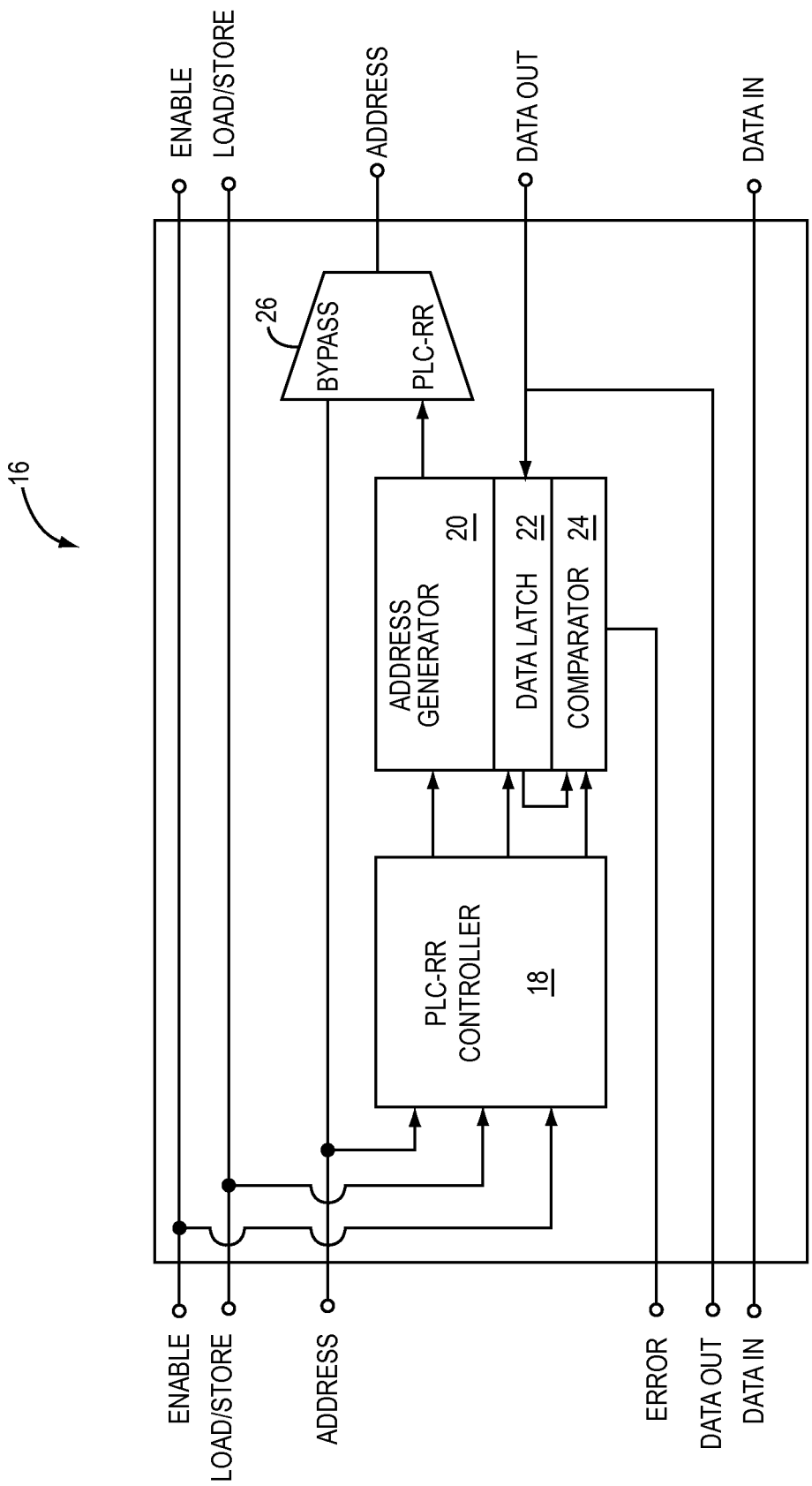
FIG. 19 shows a hardware Proactive Load and Check (PLC) checker according to one embodiment of the present disclosure.

FIG. 19 shows a hardware PLC checker 16 according to one embodiment of the present disclosure. The hardware PLC checker 16 includes a PLC controller 18, an address generator 20, a data latch 22, a comparator 24, and a MUX 26. In operation, during execution of one or more QED test programs on the logic-based processing device 10, the PLC controller 18 activates the address generator 20, which in turn generates an original address corresponding to a register or memory location of a variable used by the original test program used to generate the currently executing QED test program. The value at the original address is then loaded and latched into the data latch 22. The PLC controller 18 then activates the address generator 20 again, which in turn generates a duplicate address with a value corresponding to the original address. The duplicate address may correspond, for example, with the memory address of a duplicate value generated by EDDI-V instructions in the currently executing QED test program, as described above. The value at the duplicate address is then compared to the value stored in the data latch 22 by the comparator 24, such that any mismatch between the values indicates an error. In a general sense, the hardware PLC checker 16 checks one or more values produced by an original test program against one or more corresponding expected values at a predetermined interval.

The hardware PLC checker 16 must not interfere with the normal load and store operations of the logic-based processing device it is associated with. Additionally, the hardware PLC checker 16 cannot perform checks between a store to an original memory address and a store to a corresponding duplicate memory address, as this would cause false failures. To achieve this, the hardware PLC checker 16 only performs a load and check operation when the memory being checked does not have a load or store operation in progress, and when the load and check operation is not between a store to an original address and a store to a corresponding duplicated address. To prevent performance of a load and check operation during an active load and store operation, the enable signal of the memory is monitored, and a load and check is performed only when the enable signal is not asserted. To prevent performance of a load and check operation between a store to an original address and a store to a corresponding duplicated address, the number of store operations can be counted to ensure that an even number of store operations have occurred or, alternatively, a memory barrier instruction can be inserted after each store to a duplicated address. Those of ordinary skill in the art will appreciate that many different ways for ensuring the proper loading and storing of values in memory are achieved by the hardware PLC checker 16, all of which are contemplated herein.

Figure 20:
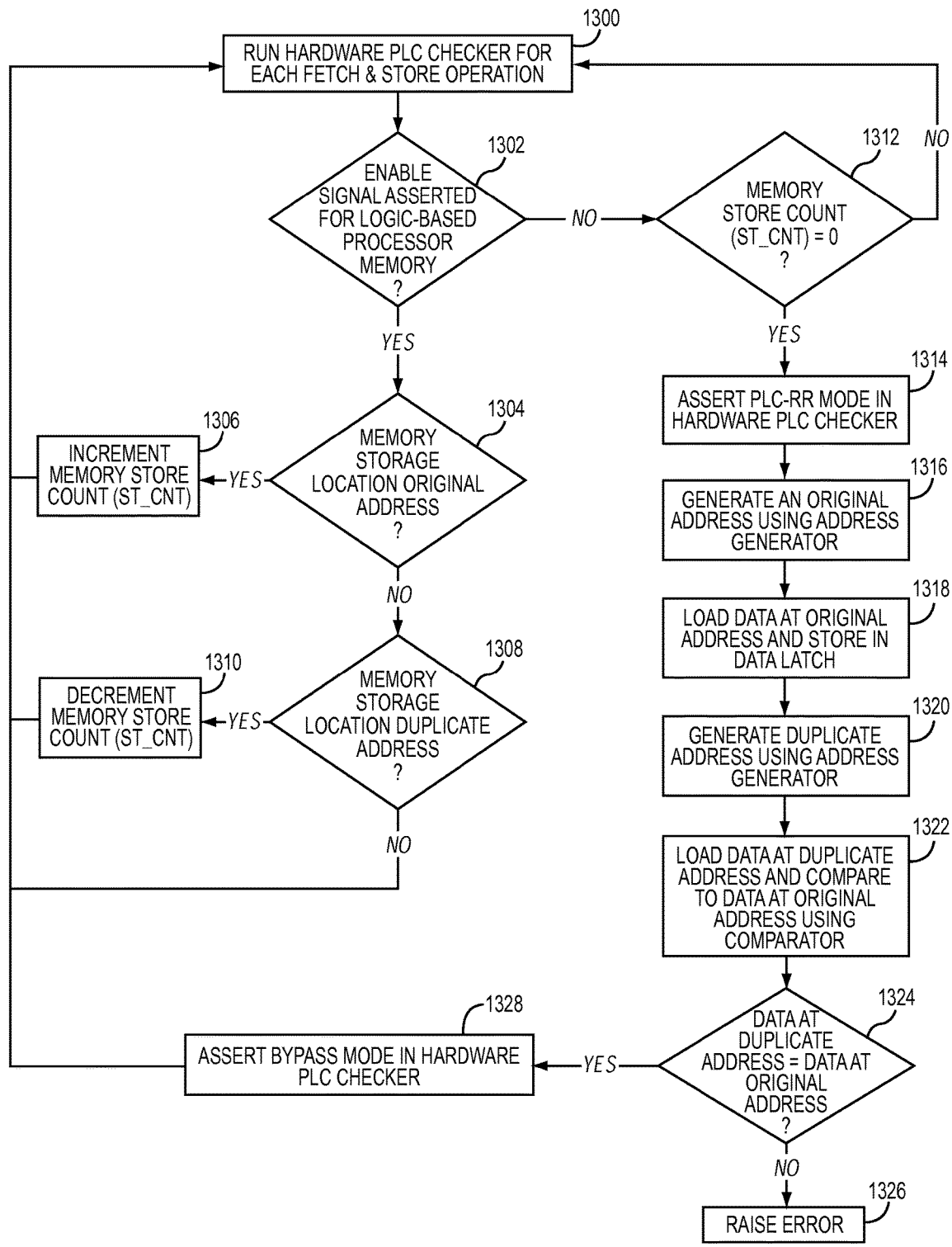
FIG. 20 is a flow diagram illustrating the operation of the hardware PLC checker shown in FIG. 19 according to one embodiment of the present disclosure.

FIG. 20 shows the specifics of operating the hardware PLC checker 16 according to one embodiment of the present disclosure. First, the hardware PLC checker 16 is run for each memory fetch and store operation of the logic-based processing device (step 1300). Next, testing is performed to determine if the enable signal from the memory associated with the logic-based processing device is asserted (step 1302). If the enable signal is asserted, further testing is then performed to determine if the current memory storage location is an original address used by the original test program (step 1304). If the current memory storage location is an original address used by the original test program, a memory store count (hereinafter st_cnt) is incremented by one (step 1306), and the process returns to step 1300. If the current memory storage location is not an original address used by the original test program, further testing is performed to determine if the current memory storage location is a duplicate memory address used by the additional instructions (step 1308). If the current memory storage location is a duplicate memory address used by the additional instructions, st_cnt is then decremented by one (step 1310), and the process returns to step 1300. If the current memory storage location is not a duplicate memory address used by the additional test instruction, the process is returned to step 1300.

If the enable signal from the memory associated with the logic-based processing device is not asserted, st_cnt is read to determine if it is equal to zero (step 1312). If st_cnt is not equal to zero, the process is returned to step 1300. If st_cnt is equal to zero, a PLC signal is asserted by the hardware PLC checker 16 (step 1314), which places the hardware PLC checker 16 in an active state. The PLC controller 18 then causes the address generator 20 to generate an original address used by the original test program (step 1316). The data at the generated original address is loaded and stored in the data latch 22 (step 1318). The PLC controller 18 then causes the address generator 20 to generate the duplicate address corresponding to the original address whose value is currently stored in the data latch 22 (step 1320). The value at the generated duplicate address is then loaded and compared to the value at the generated original address by the comparator 24 (step 1322). The output of the comparator 24 is then evaluated to determine if a mismatch occurred (step 1324). If a mismatch occurred, an error is raised (step 1326). If a mismatch did not occur, a bypass signal is asserted by the hardware PLC checker 16 (step 1328), which places the hardware PLC checker 16 in an inactive mode of operation.

Figure 21:
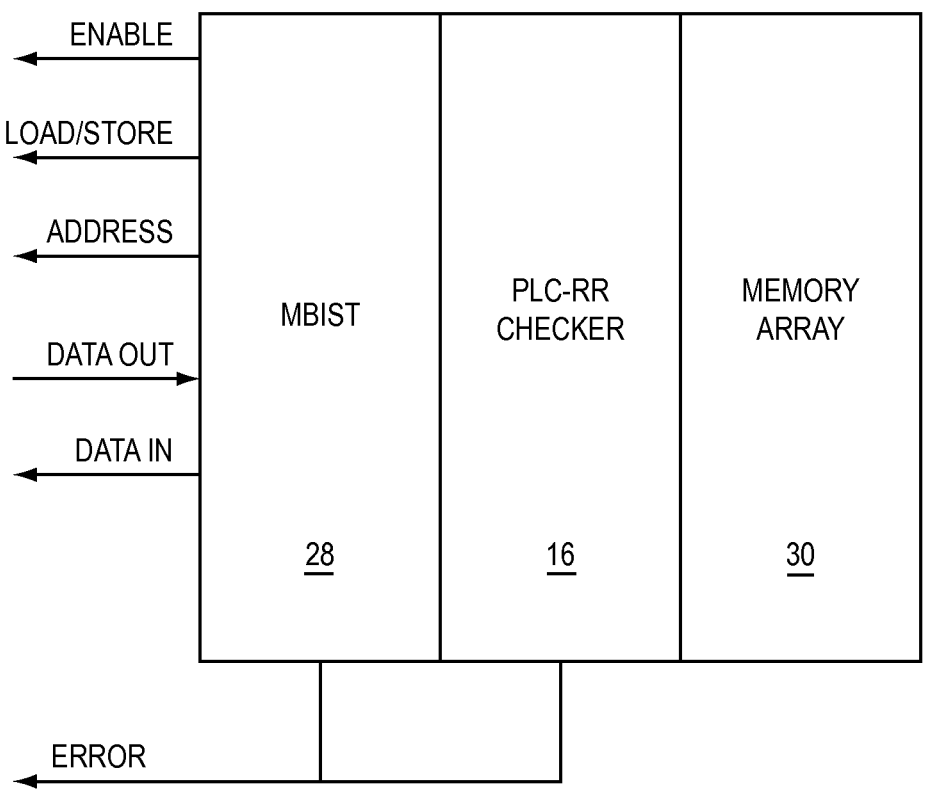
FIG. 21 shows a hardware PLC checker integrated with a Memory Built-In Self Test (MBIST) unit of a logic-based processing device according to one embodiment of the present disclosure.

There are several options for integrating the hardware PLC checker 16 with a logic-based processing device. In one embodiment, a single hardware PLC-checker 16 is used for the entire logic-based processing device. In an additional embodiment, multiple hardware PLC checkers 16 may be used. Further, since many logic-based processing devices include several built-in self-test (MBIST) engines, the hardware PLC checker 16 may be integrated into such existing MBIST engines to further reduce area costs. In one example, the comparator 24 can be shared between the MBIST and the hardware PLC checker 16. Additionally, it may be possible to repurpose a programmable MBIST as a hardware PLC checker 16 without modifying the logic-based processing device at all. FIG. 21 illustrates an embodiment wherein the hardware PLC checker 16 is integrated with an existing MBIST 28 for a logic-based processing device, in which case the hardware PLC checker 16 may be located between the MBIST 28 and a memory array 30 associated with the logic-based processing device 10.

Figure 22:
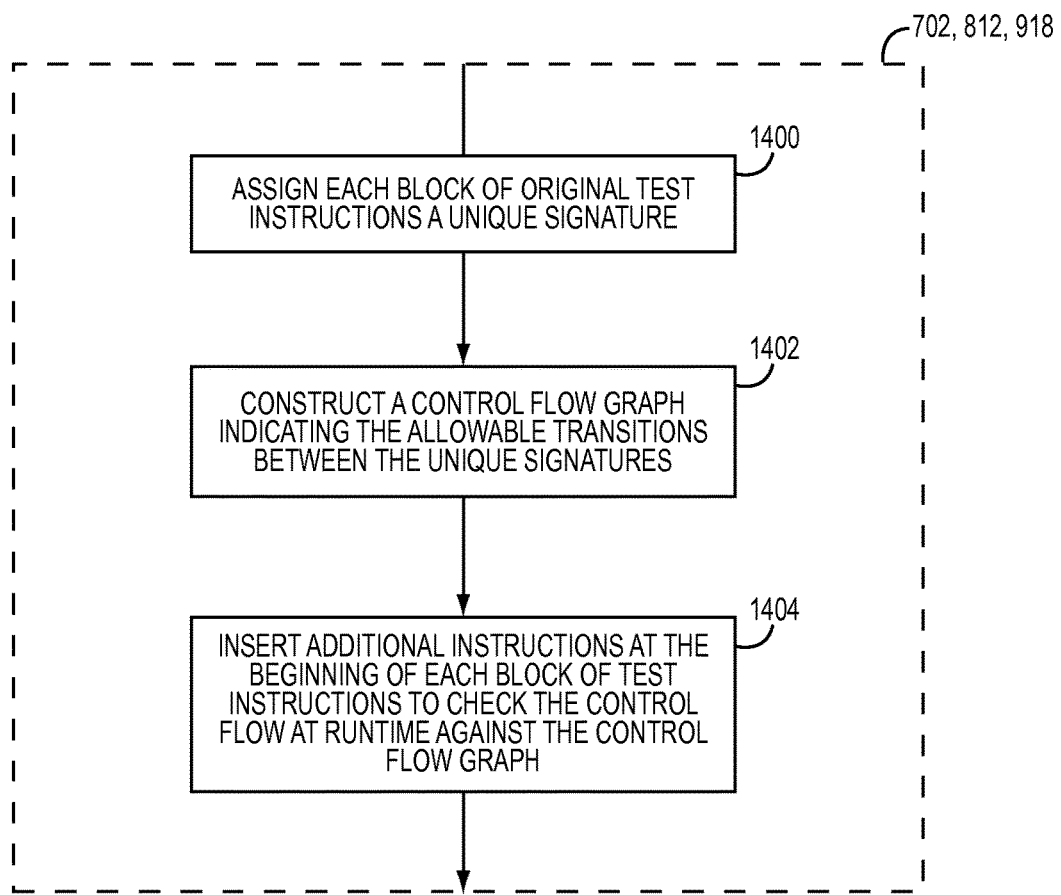
FIG. 22 is a flow diagram illustrating the details of inserting additional instructions in strategic locations of an original test program to generate a QED test program according to one embodiment of the present disclosure.

FIG. 22 shows the specifics of inserting additional instructions in strategic locations of the original test program (step 702, step 812, and step 918) wherein the additional instructions are CFCSS-V instructions. First, each block of original test instructions is assigned a unique signature (step 1400). A control flow graph indicating the allowable transitions between unique signatures (step 1402). The control flow graph may simply be an ordered list of the unique signatures, indicating the possible transitions between the unique signatures. Those of ordinary skill in the art will appreciate that the control flow graph may be generated in a variety of different ways, all of which are contemplated herein. Finally, instructions are inserted at the beginning of each block of test instructions, which check the control flow at runtime against the control flow graph (step 1404). If a transition between unique signatures occurs that is not indicated as allowable by the control flow graph, an error is raised. The instructions are inserted according to one or more of the schemes described above. By frequently testing for such errors, the error detection latency of the QED test program can be significantly reduced when compared to the original test program.

Figure 23:
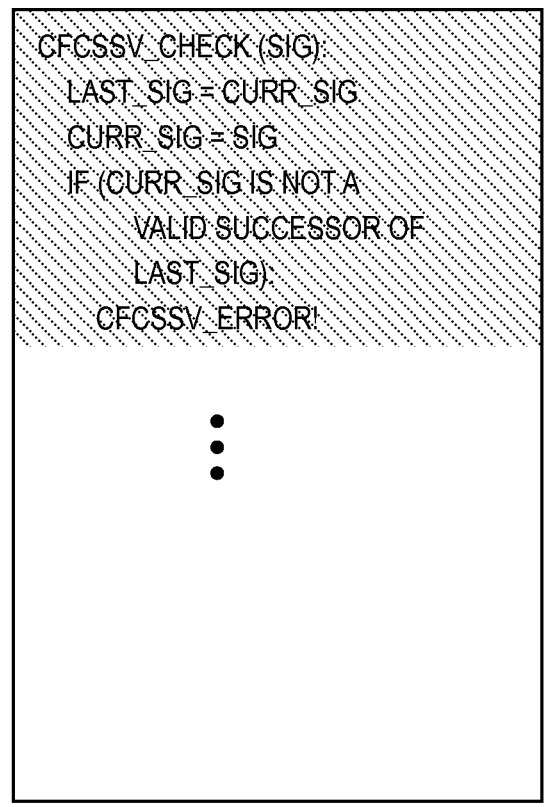
FIG. 23 shows exemplary pseudo-code instructions representing additional instructions that may be inserted in an original test program according to the process of FIG. 22 according to one embodiment of the present disclosure.

FIG. 23 shows exemplary CFCSS-V instructions in the form of pseudo-code that may be inserted at the beginning of each block of original test instructions. As shown in FIG. 23, a signature (SIG) of the currently executing block of original test instructions is passed to the function. The current signature variable (CURR_SIG) is then stored to the last signature variable (LAST_SIG), as this is no longer the current signature. The signature (SIG) is then placed in the current signature variable (CURR_SIG). It is then evaluated whether the current signature (CURR_SIG) is a valid successor of the last signature (LAST_SIG), as indicated by the control flow graph. If the current signature (CURR_SIG) is not a valid successor, an error is raised.

Similar to the PLC instructions described above, although the insertion of CFCSS-V instructions in the QED test programs significantly decreases the error detection latency thereof, such an improvement comes at the expense of an increased runtime, ultimately resulting in increased cost associated with the testing of a logic-based processing device. In an effort to expedite the testing process, CFCSS-V operations may be multi-threaded in a process known as CFCSS-V with Reduced Runtime (CFCSS-V-RR).

Figure 24:
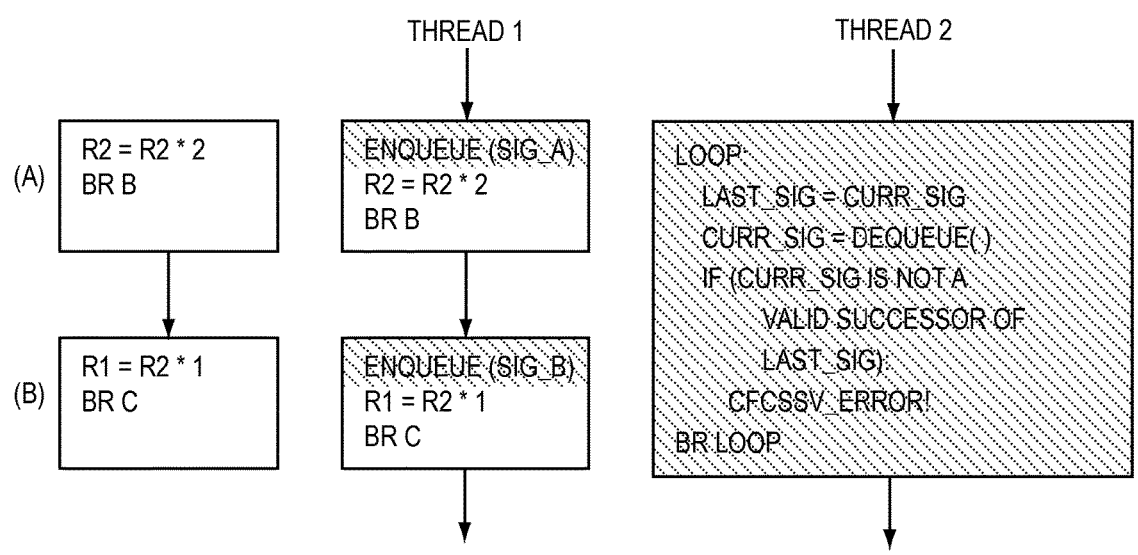
FIG. 24 shows an exemplary QED test program generated from an original test program using additional instructions optimized for a reduced runtime.

FIG. 24 shows exemplary CFCSS-V-RR instructions in the form of pseudo-code that may be inserted at the beginning of each block of original test instructions. As shown in FIG. 24, the signature of the currently executing block of original test instructions is enqueued in a First-In First-Out (FIFO) queue at the beginning of the block. A separate thread is then concurrently executed with the QED test program, which repeatedly checks the values in the queue to determine if an invalid transition has occurred between unique signatures, as described above with respect to FIG. 23. Using a separate thread to validate the control flow of the QED test program results in significant reductions in the runtime of the test program while maintaining or improving the efficacy of bug detection.

Figure 25:
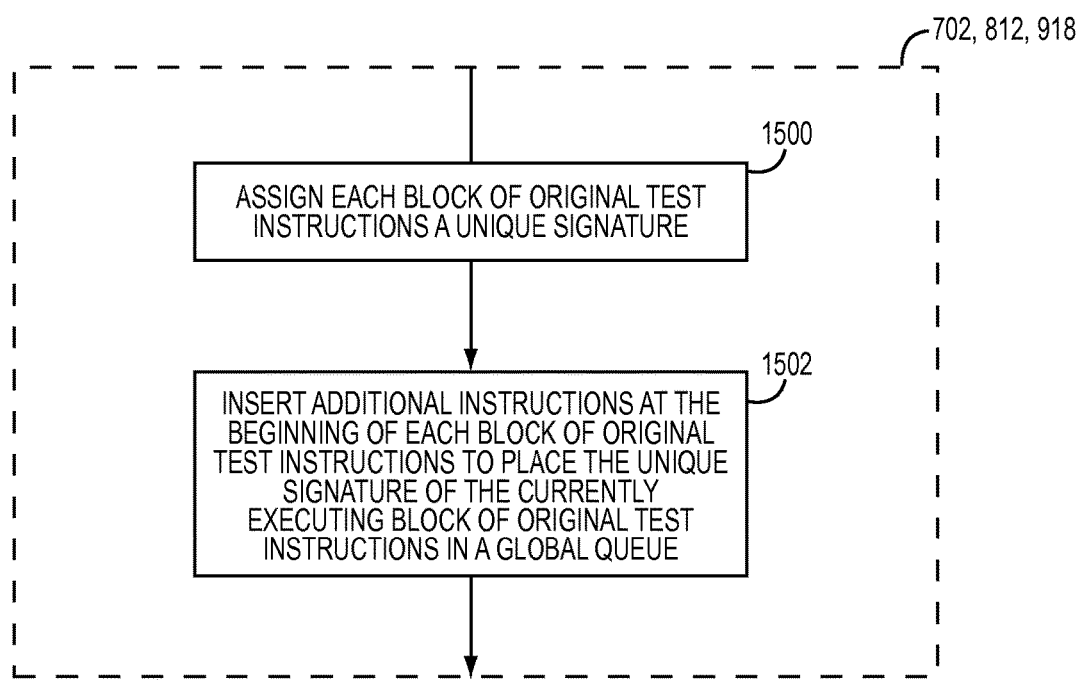
FIG. 25 is a flow diagram illustrating the details of inserting additional instructions in strategic locations of an original test program to generate a QED test program according to one embodiment of the present disclosure.

FIG. 25 shows the specifics of inserting additional instructions in strategic locations of the original test program (step 702, step 812, and step 918) wherein the additional instructions are CFTSS-V instructions. First, each block of original test instructions is assigned a unique signature (step 1500). Additional instructions are then inserted at the beginning of each block of test instructions, which place the signature of the currently executing block of original test instructions in a global queue that may be accessed by a debugger on the occurrence of a failure in the currently executing block of original test instructions (step 1502). Accordingly, upon the activation of a bug in the logic-based processing device 10, the source of the bug and location thereof are immediately apparent.

Figure 26:
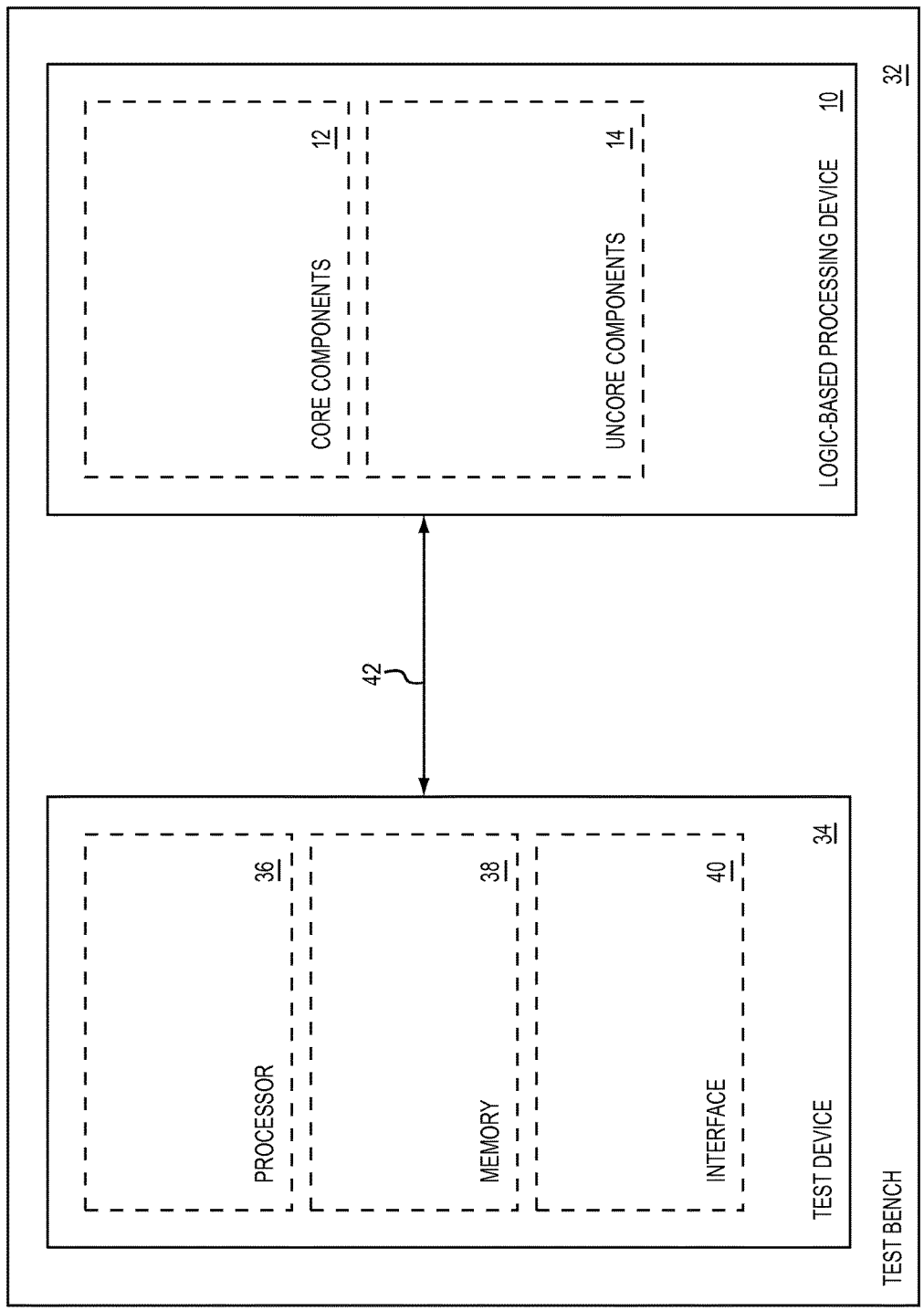
FIG. 26 shows an exemplary test bench, which can be used to generate the QED test programs and execute them on a physical logic-based processing device according to one embodiment of the present disclosure.

FIG. 26 shows an exemplary test bench 32 for generating and executing the QED test programs on the logic-based processing device 10 according to one embodiment of the present disclosure. As shown in FIG. 26, the exemplary test bench 32 includes a test device 34 and the logic-based processing device 10. The test device 34 includes a processor 36, a memory 38, and an interface 40. In general, the memory 38 of the test device 34 stores software instructions, which enable the processor 36 of the test device 34 to systematically generate one or more QED test programs as described above. The interface 40 of the test device 34 may allow for the input of one or more of the test parameters discussed above. A bus 42 allows the test device 34 to transfer the one or more test programs to the logic-based processing device 10, where they can be executed for testing.

Figure 27:
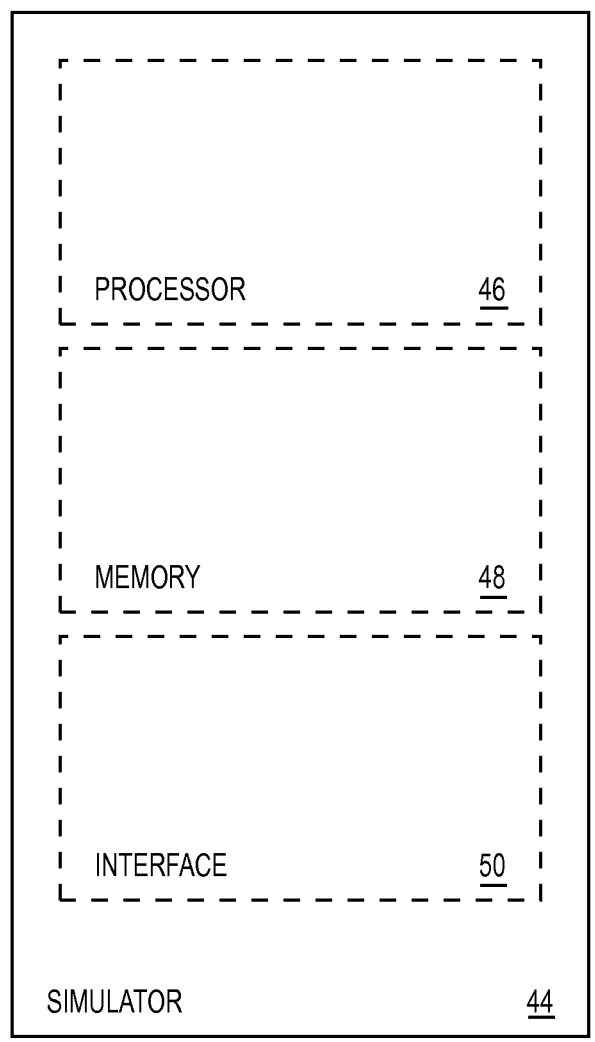
FIG. 27 shows an exemplary simulator, which can be used to generate the QED test programs and execute them on a virtualized logic-based processing device according to one embodiment of the present disclosure.

FIG. 27 shows an exemplary simulator 44 for generating and executing the QED test programs on a virtualized version of the logic-based processing device 10 according to one embodiment of the present disclosure. As shown in FIG. 27, the simulator 44 includes a processor 46, memory 48, and an interface 50. In general, the memory 48 of the simulator 44 stores software instructions, which enable the processor 46 of the simulator 44 to systematically generate one or more QED test programs as described above, and subsequently virtually execute them on a virtualized version of the logic-based processing device 10.

Although the foregoing processes are illustrated in a series of discrete steps, which are arranged in a particular order, the number and order of the illustrated steps may vary without departing from the principles of the present disclosure. For example, a single illustrated step may be accomplished through a series of discrete sub-steps. Alternatively, two or more of the illustrated steps may be accomplished as a single discrete step. Additionally, one or more of the illustrated steps may be eliminated altogether. Those of ordinary skill in the art will readily appreciate that many of the illustrated steps may be accomplished in several different ways, all of which are contemplated herein.

Those skilled in the art will recognize improvements and modifications to the embodiments of the present disclosure. All such improvements and modifications are considered within the scope of the concepts disclosed herein and the claims that follow.

What is claimed is:

1. A method of operating a test device for a logic-based processing device comprising:
    accessing an original test program;
    generating a plurality of quick error detection (QED) test programs, each of the QED test programs including the original test program with additional instructions inserted at strategic locations within the original test program, wherein the additional instructions and the strategic locations vary between each of the QED test programs and the strategic locations of the additional instructions occur periodically in each one of the plurality of QED test programs, such that the number of instructions from the original test program between the strategic locations is the same for a given QED test program; and
    storing the plurality of QED tests programs on a non-transitory memory for later execution by the logic-based processing device.

2. The method of claim 1 wherein the period of the strategic locations of the additional instructions is different for each one of the plurality of QED test programs.

3. The method of claim 2 wherein the number of instructions from the original test program between the strategic locations of the additional instructions for each one of the plurality of QED test programs are successive integers.

4. The method of claim 2 further comprising providing one or more test parameters, wherein the one or more test parameters are used to determine the period of the strategic locations of the additional instructions in each one of the plurality of QED test programs.

5. The method of claim 1 wherein the period of the strategic locations of the additional instructions in at least two of the plurality of QED test programs is the same.

6. The method of claim 1 wherein the plurality of QED test programs include at least:
a first QED test program; and
a second QED test program, wherein the strategic locations of the additional instructions in the first QED test program and the second QED test program occur at a first period.

7. The method of claim 6 wherein the plurality of QED test programs further include:
a third QED test program; and
a fourth QED test program, wherein the strategic locations of the additional instructions in the third QED test program and the fourth QED test program occur at a second period.

8. The method of claim 7 wherein the first period and the second period are successive integers.

9. The method of claim 7 wherein the plurality of QED test programs further include:
a fifth QED test program, wherein the strategic locations of the additional instructions in the fifth QED test program occur at the second period.

10. The method of claim 1 wherein the additional instructions:
duplicate each block of instructions in the original test program between the strategic locations; and
compare the result of each block of original test instructions between the strategic locations to the result of the duplicated instructions.

11. The method of claim 1 wherein the additional instructions check one or more values produced by the original test program against one or more expected values.

12. The method of claim 1 wherein the additional instructions:
assign each block of original test instructions between the strategic locations a unique signature;
construct a control flow graph indicating allowable transitions between the unique signatures; and
check if the unique signature of the currently executing block of original test instructions is a valid successor of the unique signature of the previously executed block of original test instructions based on the control flow graph.

13. The method of claim 1 wherein the additional instructions:
assign each block of original test instructions between the strategic locations a unique signature;
construct a control flow graph indicating allowable transitions between the unique signatures; and
on a separate thread from the QED test program, check if the unique signature of the currently executing block of original test instructions in the QED test program is a valid successor of the unique signature of the previously executed block of original test instructions in the QED test program based on the control flow graph.

14. The method of claim 1 wherein the additional instructions:
assign each block of original test instructions between the strategic locations a unique signature; and
save the unique signature of the currently executing block of original test instructions.

15. A test device for a logic-based processing device comprising:
a general purpose processor; and
a non-transitory memory, the non-transitory memory including:
an original set of test instructions; and
instructions configured to cause the general purpose processor to generate a plurality of quick error detection (QED) test programs, each of the QED test programs including the original set of test instructions with additional instructions inserted at strategic locations within the original set, wherein the strategic locations vary between each of the QED test programs and the strategic locations of the additional instructions occur periodically in each one of the plurality of QED test programs.

16. The test device of claim 15 wherein the period of the strategic locations of the additional instructions is different for each one of the plurality of QED test programs.

17. The test device of claim 16 wherein the period of the strategic locations of the additional instructions for each one of the plurality of QED test programs are successive integers.

18. The test device of claim 16 further comprising providing one or more test parameters, wherein the one or more test parameters are used to determine the period of the strategic locations of the additional instructions in each one of the plurality of QED test programs.

19. The test device of claim 15 wherein the period of the strategic locations of the additional instructions in at least two of the plurality of QED test programs is the same.

20. The test device of claim 15 wherein the plurality of QED test programs include at least:
a first QED test program; and
a second QED test program, wherein the strategic locations of the additional instructions in the first QED test program and the second QED test program occur at a first period.

21. The test device of claim 20 wherein the plurality of QED test programs further include:
a third QED test program; and
a fourth QED test program, wherein the strategic locations of the additional instructions in the third QED test program and the fourth QED test program occur at a second period.

22. The test device of claim 21 wherein the first period and the second period are successive integers.

23. The test device of claim 21 wherein the plurality of QED test programs further include:
a fifth QED test program, wherein the strategic locations of the additional instructions in the fifth QED test program occur at the second period.

24. The test device of claim 15 wherein the additional instructions:
duplicate each block of instructions in the original test program between the strategic locations; and
compare the result of each block of original test instructions between the strategic locations to the result of the duplicated instructions.

25. The test device of claim 15 wherein the additional instructions check one or more values produced by the original test program against one or more expected values.

26. The test device of claim 15 wherein the additional instructions:
assign each block of original test instructions between the strategic locations a unique signature;

construct a control flow graph indicating allowable transitions between the unique signatures; and check if the unique signature of the currently executing block of original test instructions is a valid successor of the unique signature of the previously executed block of original test instructions based on the control flow graph.

27. The test device of claim 15 wherein the additional instructions:

assign each block of original test instructions between the strategic locations a unique signature;

construct a control flow graph indicating allowable transitions between the unique signatures; and on a separate thread from the thread used to execute the QED test program, check if the unique signature of the currently executing block of original test instructions in the QED test program is a valid successor of the unique signature of the previously executed block of original test instructions in the QED test program based on the control flow graph.

28. The test device of claim 15 wherein the additional instructions:

assign each block of original test instructions between the strategic locations a unique signature; and place the unique signature of the currently executing block of original test instructions in a global queue.

* * * * *